(12) United States Patent
Duyckaerts et al.

(10) Patent No.: US 12,515,204 B2
(45) Date of Patent: Jan. 6, 2026

(54) SHAPED CATALYST BODY WITH IMPROVED PROPERTIES, ITS PREPARATION AND USE

(71) Applicant: BASF SE, Ludwigshafen am Rhein (DE)

(72) Inventors: Nicolas Duyckaerts, Ludwigshafen am Rhein (DE); Kazuhiko Amakawa, Ludwigshafen am Rhein (DE); Jens Weiguny, Ludwigshafen am Rhein (DE); Christian Walsdorff, Ludwigshafen am Rhein (DE); Miguel Angel Romero Valle, Ludwigshafen am Rhein (DE); Gerald Meyer, Ludwigshafen am Rhein (DE); Rouven Weiler, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 379 days.

(21) Appl. No.: 17/927,373

(22) PCT Filed: May 17, 2021

(86) PCT No.: PCT/EP2021/062928
§ 371 (c)(1),
(2) Date: Nov. 23, 2022

(87) PCT Pub. No.: WO2021/239483
PCT Pub. Date: Dec. 2, 2021

(65) Prior Publication Data
US 2024/0278222 A1   Aug. 22, 2024

(30) Foreign Application Priority Data

May 26, 2020   (EP) ..................... 20176583

(51) Int. Cl.
*B01J 27/198*  (2006.01)
*B01J 8/02*  (2006.01)
(Continued)

(52) U.S. Cl.
CPC ............... *B01J 27/198* (2013.01); *B01J 8/02* (2013.01); *B01J 35/40* (2024.01); *B01J 35/50* (2024.01);
(Continued)

(58) Field of Classification Search
None
See application file for complete search history.

(56) References Cited

U.S. PATENT DOCUMENTS 4,656,157 A   4/1987   Hofmann et al.
4,933,312 A   6/1990   Haddad et al.
(Continued)

FOREIGN PATENT DOCUMENTS

CN   107743419 A   2/2018
WO   95/29006 A1   11/1995
(Continued)

OTHER PUBLICATIONS

International Search Report for PCT Patent Application No. PCT/EP2021/062928, Issued on Jul. 8, 2021, 8 pages.

*Primary Examiner* — Stefanie J Cohen
*Assistant Examiner* — Jialan Zhang
(74) *Attorney, Agent, or Firm* — Faegre Drinker Biddle & Reath LLP

(57) ABSTRACT

A shaped catalyst body for heterogeneously catalyzed reactions of organic compounds in the gas-phase in fixed-bed reactors, containing an element from group 3 to 12 of the Periodic Table of the Elements, and having a three-lobed structure with a lateral surface around the lobes, a top cover and a bottom cover, as well as three continuous holes (Continued)

running from one cover side to the other cover side, wherein each hole is assigned to one lobe and wherein the cover sides have outwardly shaped arches, its production and a process for its use in the heterogeneously catalyzed reaction of an organic compound in the gas phase.

15 Claims, 11 Drawing Sheets

(51) Int. Cl.
    *B01J 35/37*      (2024.01)
    *B01J 35/40*      (2024.01)
    *B01J 35/50*      (2024.01)
    *B01J 35/55*      (2024.01)
    *C07C 51/25*      (2006.01)
    *C07D 307/60*      (2006.01)

(52) U.S. Cl.
    CPC .............. *B01J 35/55* (2024.01); *C07C 51/252* (2013.01); *C07D 307/60* (2013.01); *B01J 35/37* (2024.01)

(56) References Cited

U.S. PATENT DOCUMENTS

| | | |
|---|---|---|
| 5,137,860 A | 8/1992 | Ebner et al. |
| 5,168,090 A | 12/1992 | Ebner et al. |
| 5,326,915 A | 7/1994 | Mola et al. |
| 5,330,958 A | 7/1994 | Mola et al. |
| 5,861,353 A | 1/1999 | Mola et al. |
| 5,861,535 A | 1/1999 | Mylroie |
| 7,060,649 B2 | 6/2006 | Weiguny et al. |
| 2001/0029235 A1 | 10/2001 | Walsdorff et al. |
| 2004/0133052 A1 | 7/2004 | Petrolli et al. |
| 2005/0101803 A1 | 5/2005 | Dieterle et al. |
| 2005/0202803 A1 | 9/2005 | Mahalal |
| 2009/0306410 A1 | 12/2009 | Brandstaedter et al. |
| 2011/0257413 A1 | 10/2011 | Dobner et al. |
| 2013/0023699 A1 | 1/2013 | Macht et al. |
| 2013/0338378 A1 | 12/2013 | Reitzmann et al. |
| 2018/0104674 A1 | 4/2018 | Grüne et al. |
| 2019/0151835 A1 | 5/2019 | Tazawa et al. |

FOREIGN PATENT DOCUMENTS

| | | |
|---|---|---|
| WO | WO-2010029323 A1 * | 3/2010 |
| WO | 2019/156953 A2 | 8/2019 |
| WO | 2019/170406 A1 | 9/2019 |
| WO | 2020/078657 A1 | 4/2020 |
| WO | WO-2020108872 A1 * | 6/2020 |

* cited by examiner

Fig. 1  Gross sections of shaped catalyst body (inventive)
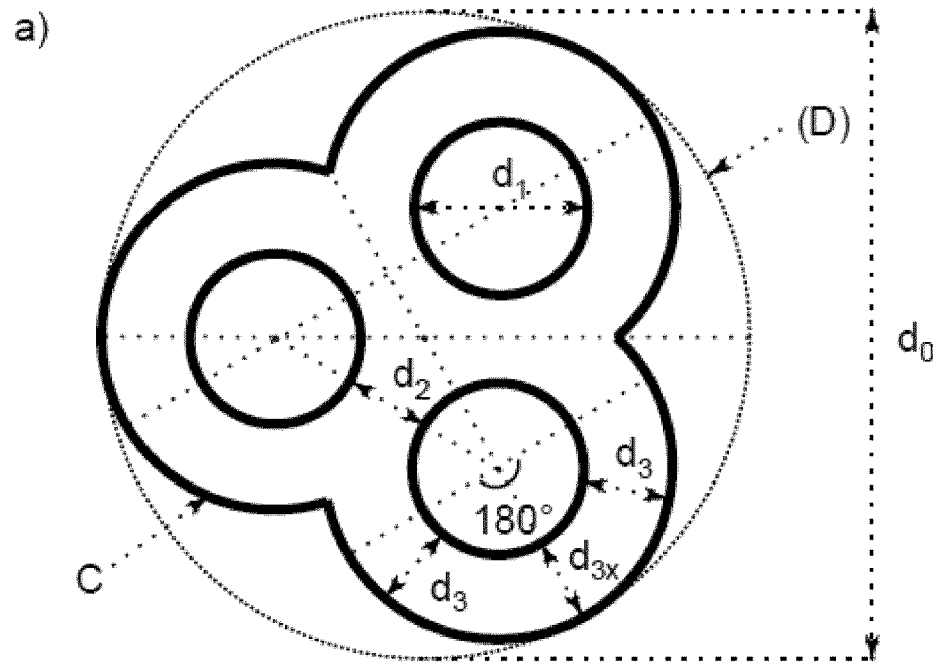
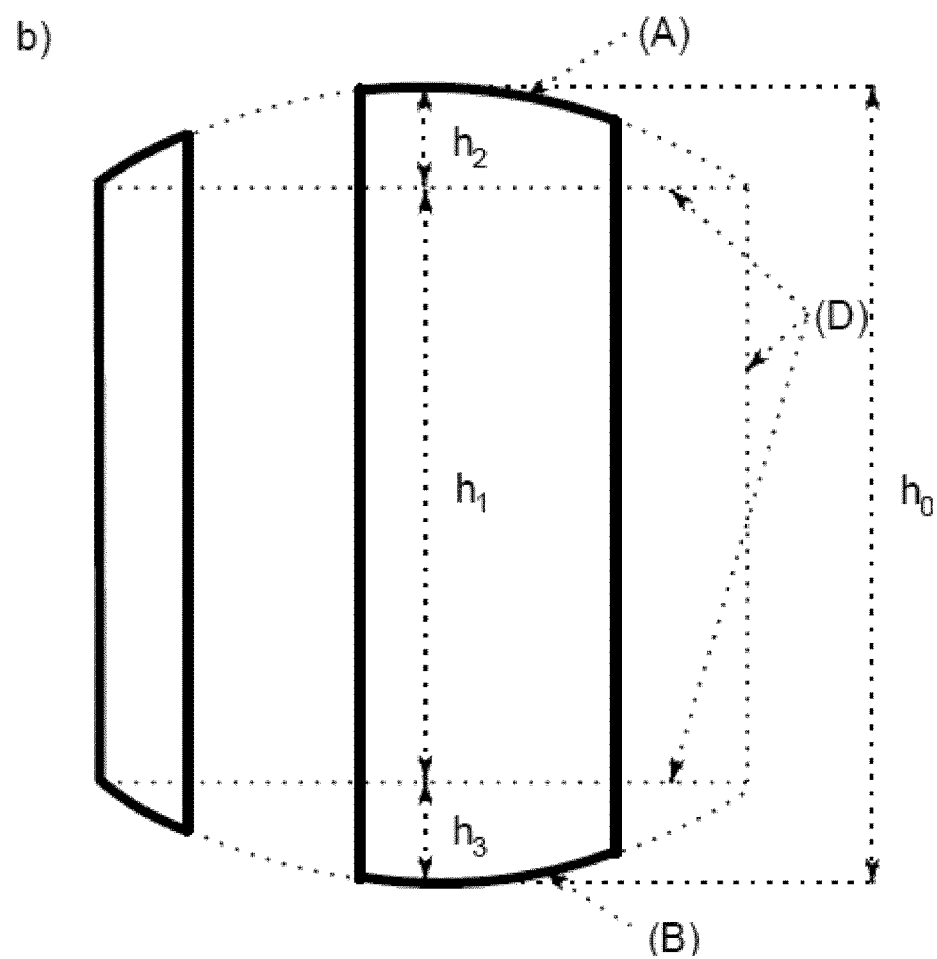

Fig. 2    Shapes of outwardly curved arches (inventive)
a)
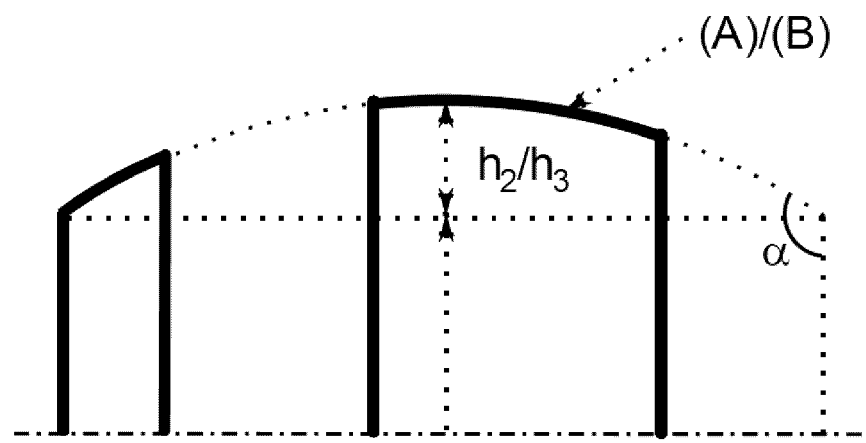
b)
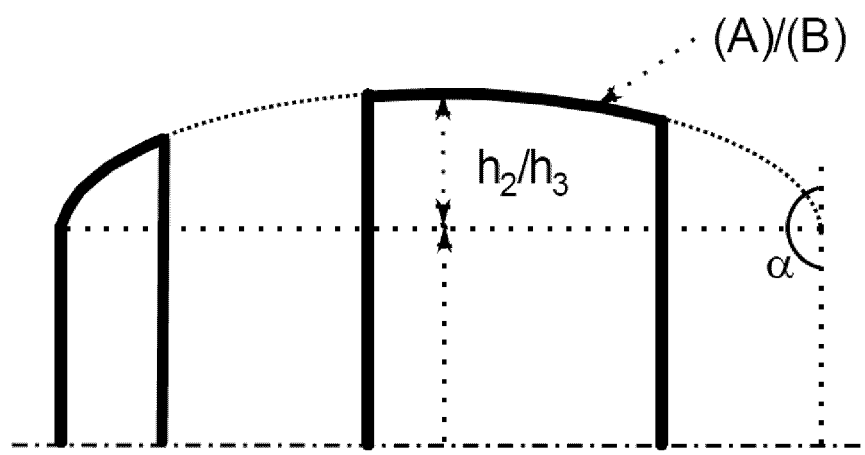

Fig. 3   Shapes of outwardly curved arches (inventive)
a)
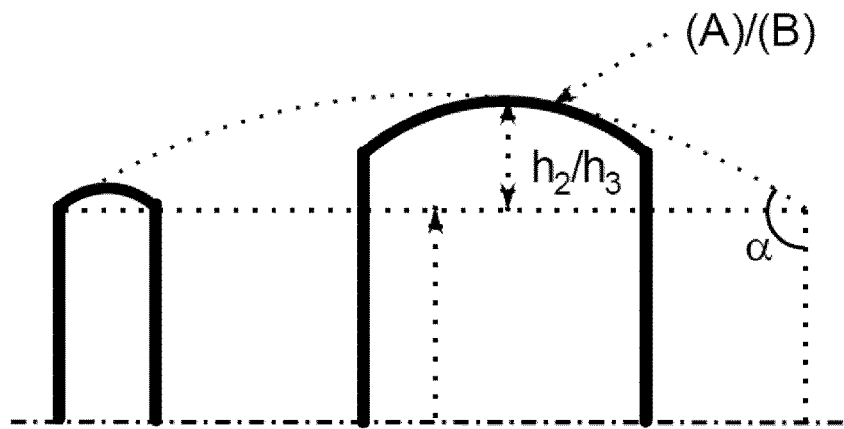
b)
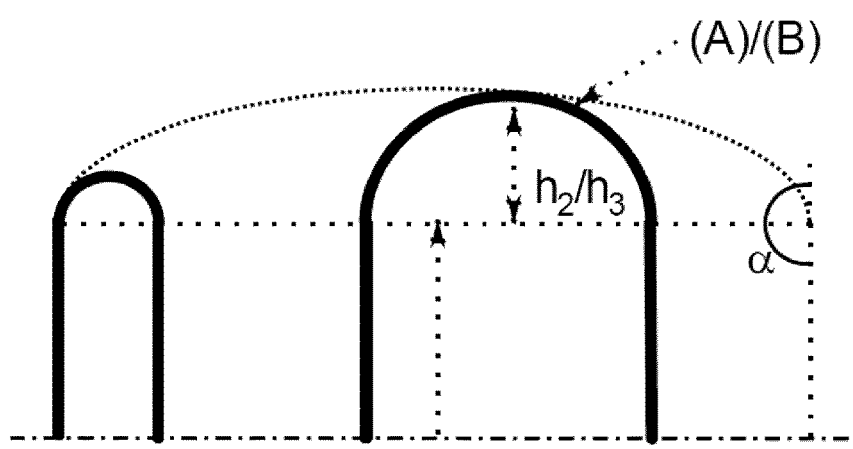
c)
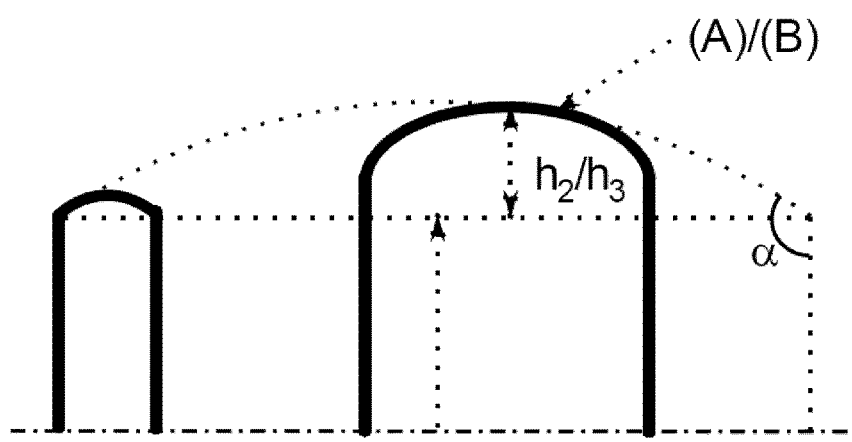

Fig. 4
Shapes of the notches of the three-lobed structure (inventive)
a)
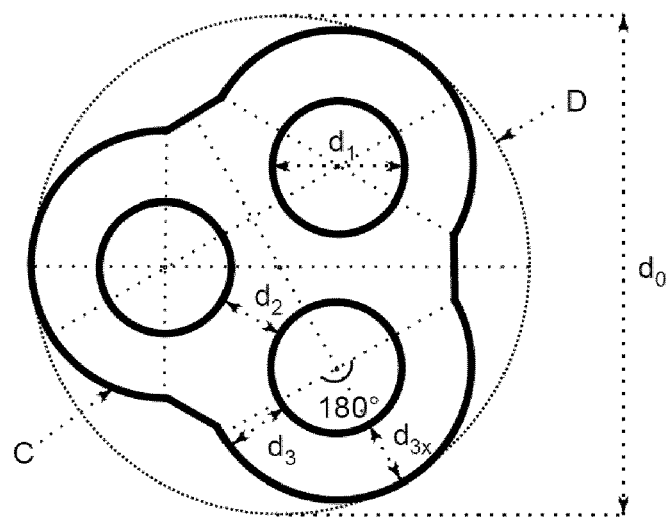
b)
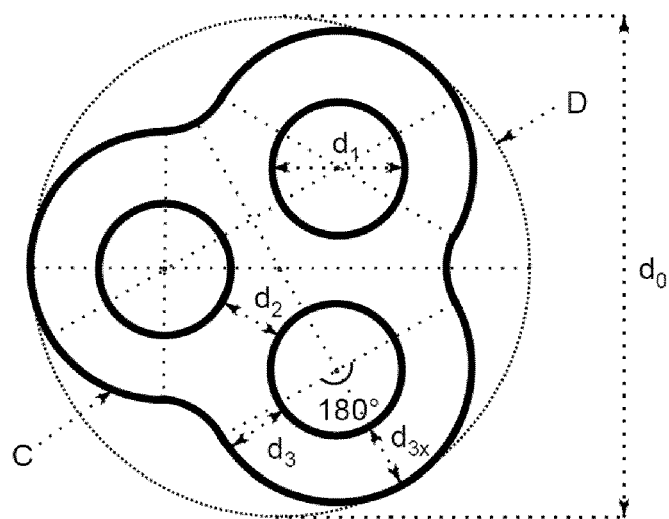
c)
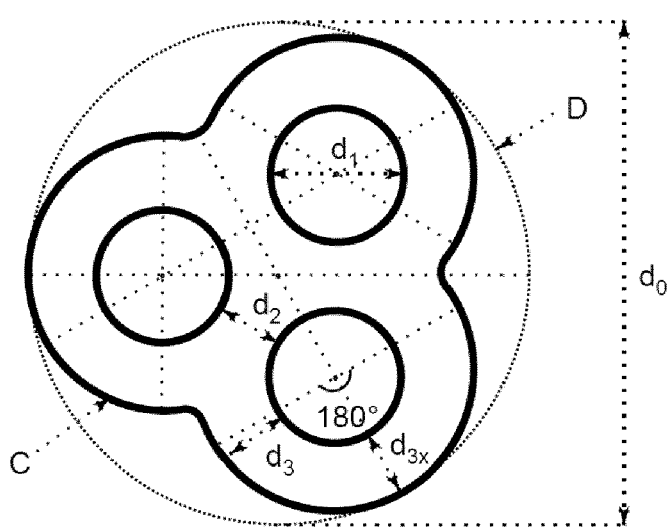

Fig. 5    Shaped catalyst body (inventive)
a)
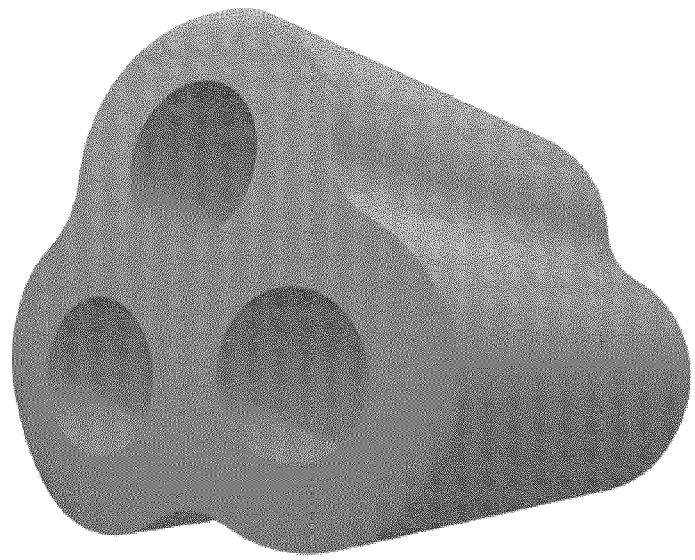
b)
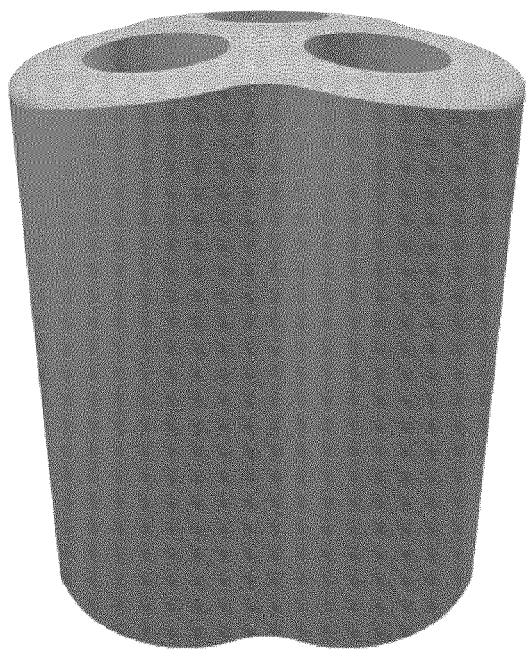
c)
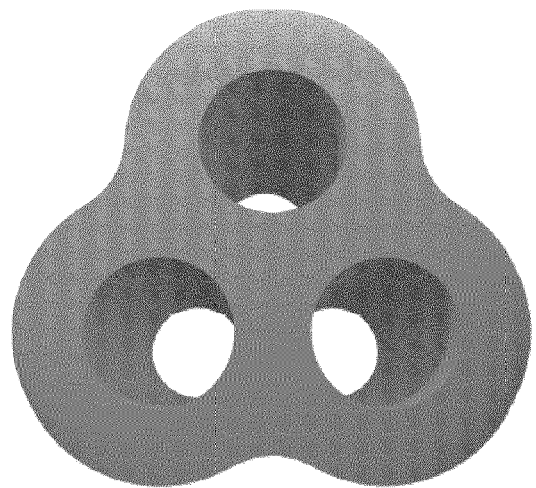

Fig. 6

Properties of the shaped catalyst bodies (examples 1-5)

| | | Ex. 1 (comp.) | Ex. 2 (comp.) | Ex. 3 (comp.) | Ex. 4 (inv.) | Ex. 5 (inv.) |
|---|---|---|---|---|---|---|
| Shaped body | | Ring<br>1 hole<br>flat covers | Ring<br>1 hole<br>flat covers | Trilobe<br>3 holes<br>flat covers | Trilobe<br>3 holes<br>curved covers | Trilobe<br>3 holes<br>curved covers |
| Schematic drawing | | | | | | |
| Dimensions | $d_o \times h_o \times d_1$ [mm] | 6.5 x 5.0 x 3.5 | 5.5 x 3.0 x 3.0 | 7.5 x 9.2 x 2.0 | 7.5 x 7.5 x 2.0 | 7.5 x 7.5 x 2.0 |
| | $h_1$ [mm] | 5.0 | 3.0 | 9.2 | 6.6 | 5.5 |
| | $h_2 = h_3$ [mm] | 0 | 0 | 0 | 0.45 | 1.00 |
| | $d_2$ [mm] | --- | --- | 1.00 | 1.00 | 1.00 |
| | $d_3$ [mm] | 1.50 | 1.25 | 1.00 | 1.00 | 1.00 |
| Surface area SA | [mm²] | 203.6 | 113.1 | 423.7 | 341.8 | 329.8 |
| Body volume V | [mm³] | 117 | 49.8 | 216 | 171 | 165 |
| Characteristic length V/SA | [mm] | 0.57 | 0.44 | 0.51 | 0.50 | 0.50 |
| Side crush strength SCS | [N] | 22.3 | 12.3 | 57.1 | 46.7 | 48.1 |
| Side crush strength per body crush volume SCS/V | [N/mm³] | 0.191 | 0.247 | 0.264 | 0.273 | 0.292 |
| Packing density in 21 mm reactor tube | [kg/m³] | 354 | 381 | 304 | 322 | 330 |
| SA per packing volume in 21 mm reactor tube | [m²/m³] | 616 | 865 | 596 | 648 | 653 |
| Pressure drop dp in 21 mm reactor tube @ 1.0 m/s | [Pa/m] | 1080 | 2174 | 612.1 | 779.9 | 870.5 |

Fig. 7    Simulated packed beds in 21 mm tube (examples 1-5)
| Ex. 1 (comp.) | Ex. 2 (comp.) | Ex. 3 (comp.) | Ex. 4 (inv.) | Ex. 5 (inv.) |
|---|---|---|---|---|
| Ring<br>1 hole<br>flat covers | Ring<br>1 hole<br>flat covers | Trilobe<br>3 holes<br>flat covers | Trilobe<br>3 holes<br>curved covers | Trilobe<br>3 holes<br>curved covers |
|  | 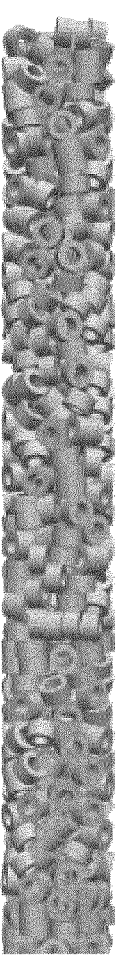 | 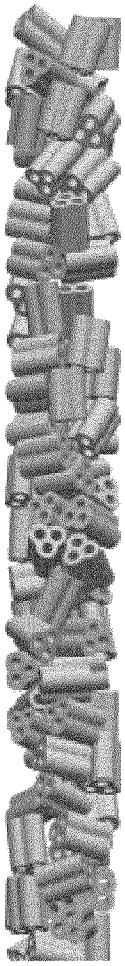 |  |  |

Fig. 8    Valuation of the results of examples 1-5

|  | Ex. 1 (comp.) | Ex. 2 (comp.) | Ex. 3 (comp.) | Ex. 4 (inv.) | Ex. 5 (inv.) |
|---|---|---|---|---|---|
| Characteristic length (V/SA) | - | + | + | + | + |
| Side crush strength per tablet volume (SCS/V) | - | + | + | + | + |
| Packing density | + | + | - | + | + |
| SA per packing density | o | + | - | + | + |
| Pressure drop (dp) | o | - | + | + | + |

Legend:  "-" = disadvantageous
         "o" = neutral
         "+" = advantageous

Fig. 9

Properties of the shaped catalyst bodies (examples 6-10)

| | | | Ex. 6 (comp.) | Ex. 7 (comp.) | Ex. 8 (inv.) | Ex. 9 (comp.) | Ex. 10 (inv.) |
|---|---|---|---|---|---|---|---|
| Shaped body | | | Ring<br>1 hole<br>flat covers | Trilobe<br>3 holes<br>flat covers | Trilobe<br>3 holes<br>curved covers | Trilobe<br>3 holes<br>flat covers | Trilobe<br>3 holes<br>curved covers |
| Schematic drawing | | |  |  | 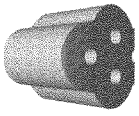 |  |  |
| Dimensions | $d_0 \times h_0 \times d_1$ | [mm] | 5.0 × 5.0 × 2.0 | 8.0 × 7.5 × 1.5 | 8.0 × 7.5 × 1.5 | 8.3 × 7.8 × 1.5 | 8.3 × 7.8 × 1.2 |
| | $h_1$ | [mm] | 5.0 | 7.5 | 6.3 | 7.8 | 7.1 |
| | $h_2 = h_3$ | [mm] | 0 | 0 | 0.6 | 0 | 0.35 |
| | $d_2$ | [mm] | --- | 1.50 | 1.50 | 1.83 | 1.83 |
| | $d_3$ | [mm] | 1.50 | 1.50 | 1.50 | 1.83 | 1.83 |
| Surface area SA | | [mm²] | 131 | 348 | 331 | 356 | 345 |
| Body volume V | | [mm³] | 83 | 249 | 238 | 306 | 299 |
| Characteristic length V/SA | | [mm] | 0.63 | 0.71 | 0.72 | 0.86 | 0.87 |
| Side crush strength SCS | | [N] | 39 | 116 | 112 | 176 | 174 |
| Side crush strength per body volume SCS/V | | [N/mm³] | 0.47 | 0.47 | 0.47 | 0.58 | 0.58 |
| Packing density in 26 mm reactor tube | | [kg/m³] | 484 | 423 | 460 | 448 | 475 |
| SA per packing volume in 26 mm reactor tube | | [m²/m³] | 767 | 580 | 623 | 505 | 529 |
| Pressure drop dp in 26 mm reactor tube @ 1.0 m/s | | [Pa/m] | 3657 | 1259 | 1657 | 1149 | 1544 |

Fig. 10   Simulated packed beds in 26 mm tube (examples 6-10)
| Ex. 6 (comp.) | Ex. 7 (comp.) | Ex. 8 (inv.) | Ex. 9 (comp.) | Ex. 10 (inv.) |
|---|---|---|---|---|
| Ring 1 hole flat covers | Trilobe 3 holes flat covers | Trilobe 3 holes curved covers | Trilobe 3 holes flat covers | Trilobe 3 holes curved covers |
| 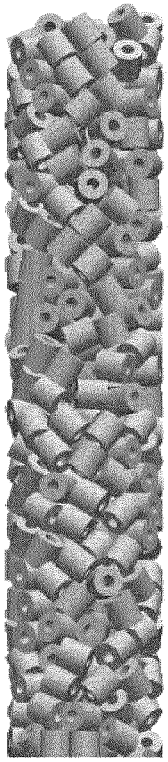 |  | 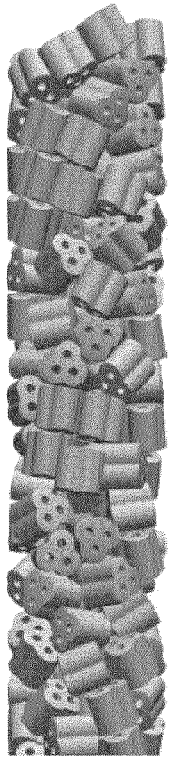 | 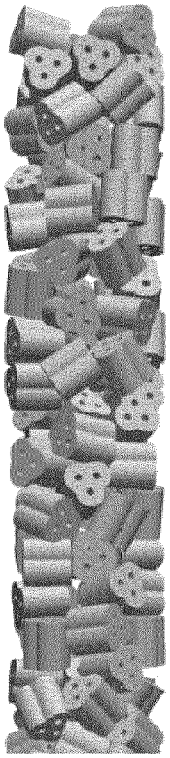 | 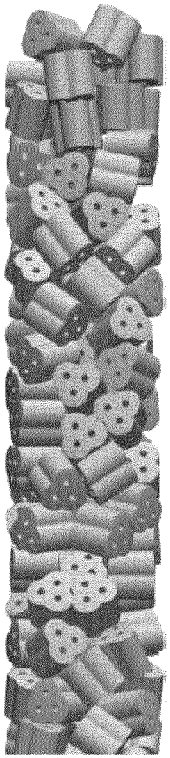 |

Fig. 11      Valuation of the results of examples 6-10

|  | Ex. 6 (comp.) | Ex. 7 (comp.) | Ex. 8 (inv.) | Ex. 9 (comp.) | Ex. 10 (inv.) |
|---|---|---|---|---|---|
| Characteristic length (V/SA) | + | + | + | o | o |
| Side crush strength per tablet volume (SCS/V) | o | o | o | + | + |
| Packing density | + | - | + | - | + |
| SA per packing volume | + | o | + | - | o |
| Pressure drop (dp) | - | + | + | + | + |

Legend:  "-" = disadvantageous
         "o" = neutral
         "+" = advantageous

SHAPED CATALYST BODY WITH IMPROVED PROPERTIES, ITS PREPARATION AND USE

CROSS-REFERENCE TO RELATED APPLICATIONS

This application is a National stage application (under 35 U.S.C. § 371) of PCT/EP2021/062928, filed May 7, 2021, which claims benefit of European Application No. 20176583.1, filed May 26, 2020, both of which are incorporated herein by reference in their entirety.

The present invention relates to a shaped catalyst body for heterogeneously catalyzed reactions of organic compounds in the gas-phase in fixed-bed reactors, containing an element from group 3 to 12 of the Periodic Table of the Elements, and having a three-lobed structure with a lateral surface around the lobes, a top cover and a bottom cover, as well as three continuous holes running from one cover side to the other cover side, wherein each hole is assigned to one lobe, whereby the cover sides are specifically designed to simultaneously enable a high mechanical stability, a low ratio of the body volume to the surface area, a high efficiency of the diffusion paths, a high efficiency of the heat exchange, a high packing density and a low pressure drop.

Furthermore, the present invention relates to a process for the preparation of such a shaped catalyst body.

Additionally, the present invention relates to a reactor tube which is filled with such shaped catalyst bodies.

Moreover, the present invention relates to a process for the heterogeneously catalyzed gas-phase oxidation of an organic compound in the presence of an oxygen containing gas and such a shaped catalyst body.

Shaped catalysts are inter alia used for selective gas-phase oxidations, such as the oxidation of n-butane or benzene to maleic anhydride, the oxidation of propene to acrolein, the oxidation of iso-butene to methacrolein and for various other industrially important gas-phase oxidations. Maleic anhydride, for example, is an important intermediate for the synthesis of γ-butyrolactone, tetrahydrofuran and 1,4-butanediol, which in turn can be used as solvents or as precursors in the production of polytetrahydrofuran or polyvinylpyrrolidone.

The preparation of maleic anhydride by heterogeneously catalyzed gas-phase oxidation of hydrocarbons is generally carried out using pelletized or extruded bulk catalysts based on vanadyl pyrophosphate $(VO)_2P_2O_7$, known as VPO catalysts. A variety of different geometric shapes of such catalysts including holes, grooves, notches and jags are described in the state of the art.

U.S. Pat. No. 5,168,090 describes various different shapes of VPO catalysts for the oxidation of n-butane to maleic anhydride, which are believed to improve the known catalyst systems such as tablets, pellets, spheres or spheroids in relation to cost reduction and increase in maleic anhydride yield. The US patent inter alia illustrates (a) solid cylinders with or without a central continuous hole in the center and having a circular external surface or an external surface with rounded or angular grooves disposed running from the top to the bottom, (b) solid cylinders with a continuous angular spiral disposed in the external surface running from the top to the bottom, (c) solid cylinders with a central continuous hole and a continuous open groove between the external surface and the central hole, (d) solid square-based pyramids with rounded grooves disposed in the external surface at the corner edge or at the sloping sides running from the pointed top to the bottom, (e) solid cones with rounded grooves disposed in the external surface running from the pointed top to the bottom, (f) solid cubes with angular grooves disposed in the external surface running from the top to the bottom, (g) solid cubes with rounded dimples disposed in the external surface at the four sides, at the top and at the bottom, and (h) solid spheres with rounded dimples disposed in the external surface. It was realized that notches in the external surface are important for achieving an enhanced catalyst activity.

U.S. Pat. No. 4,656,157 points out that cylinders and particularly hollow cylinders and rings have a lower pressure drop over the reactor cross section than spheres but also a lower abrasion-resistance than spheres, which at the end is disadvantageous. It is therefore suggested to use in gas-phase oxidation reactions hollow cylinders with convexly curved end faces instead of spheres, cylinders or hollow cylinders with flat end faces. The convexly shaped end faces increase the abrasion-resistance compared with flat end faces and simultaneously ensures a low pressure drop and an advantageous catalytic activity.

US 2001/0,029,235 deals with the optimization of the pressure drop of shaped catalysts for heterogeneously catalyzed strongly exothermic gas-phase reactions such as the oxychlorination of ethylene to 1,2-dichloroethane. It was found that hollow cylinders or annular tablets with end surfaces at the top and the bottom, which are rounded to the outer edge and to the edge to the central continuous hole, show a significantly lower pressure drop than hollow cylinders or annular tablets of the same size but with end surfaces at the top and the bottom only rounded to the outer edges, i.e. convexly curved over the whole cross section as it was taught in U.S. Pat. No. 4,656,157.

In US 2019/0,151,835, the effects of the shape of the end surfaces of hollow cylinders on the properties of the catalyst particles was further investigated. The inventors found that end surfaces which are flatly ascending from the outer peripheral edge to the center line enable a low pressure drop in combination with a high catalytic conversion rate and a high selectivity in the oxidation of acrolein to acrylic acid.

However, hollow cylinders or rings with only a single central hole have limitations when aiming to combine low pressure drop and short intra-particle diffusion length, which would require thin walls, with high mechanical stability.

Another shape for VPO catalysts for the oxidation of n-butane to maleic anhydride is disclosed in US 201310, 338,378. It describes a cylinder with four rounded corners along its cross section and a waved outer side-surface between the rounded corners, a flat top and bottom side and at least one continuous hole running from the top to the bottom. Such geometric form is described to have a high mechanical stability with a simultaneous low density and short diffusion paths. Compared with rings, the pressure drop of a filling with particles of such a shape is significantly lower. It is emphasized that VPO catalysts with such a shape show an improved performance in the production of maleic anhydride over classical rings.

WO 2019/156.953 picked up the idea mentioned in U.S. Pat. No. 5,168,090 to use vanadium phosphorous oxide in form of solid cylinders with rounded grooves disposed in the external surface running from the top to the bottom and with a central continuous hole in the cylinder for the partial oxidation of n-butane to maleic anhydride, and complements this idea with further data on how to implement such catalysts. The publication shows that such cylinders have advantages over corresponding cylinders without a central continuous hole.

The shaped catalyst bodies described in US 2013/0,338,378 and WO 2019/156,953 can be seen as a further development of the hollow cylinders described in U.S. Pat. No. 4,656,157, US 2001/0,029,235 und US 2019/0,151,835, but still show limitations in targeting a low pressure drop together with a short intra-particle diffusion length in combination with a high mechanical stability.

A further advancement of VPO catalysts for the oxidation of n-butane to maleic anhydride is disclosed in US 2011/0,257,413. It describes a shaped catalyst body with an essentially cylindrical body with an essentially circular cross section, and having a longitudinal axis with two to five, preferably four, internal continuous holes parallel to the cylinder axis, which are equidistantly and symmetrically located over the cross section. In case of a cylinder with four continuous holes, the centers of the holes form the corners of a regular square. Due to the internal holes, the shaped catalyst body has a large external surface area and displays a low pressure drop. Additionally, it also shows a satisfactory mechanical stability.

However, the mentioned shape has the disadvantage that diffusion length as a result of the wall thickness is relatively inhomogeneous in the catalyst shape. The presence of two to five holes in a cylinder with a circular cross section intrinsically leads to weak points at the corners of the geometrical shape which can be drawn by connecting the holes. With catalyst shapes to be used in relatively thin tubes with inner diameters of typically 20 to 35 mm such as used in many selective oxidation processes, there is also the general challenge of scaling down the shape to a size small enough for a reasonably homogeneous catalyst bed packing, which avoids excessive channeling or by-passing of reaction fluent. With increasing complexity of shape topology such as having four continuous holes, this challenge is relatively severe. A further challenge related to filling reactor tubes and the catalyst beds in such tubes is the problem of stacked packing of several cylindrically shaped catalyst bodies with a circular circumference and a flat top of each other due to the flat top and bottom surfaces of the described shapes, especially when the shapes have a diameter larger than their heights.

U.S. Pat. Nos. 5,330,958, 5,326,915 and 5,861,353 point out that catalyst shapes described in the state of the art often show very limited diffusion properties, even though the diffusion of the reactant gases inside the interior of the catalyst particles and the back-diffusion of the reaction products outside the interior of the catalyst particles is one decisive feature for the catalyst efficiency. Moreover, it was underlined that catalysts for exothermic reactions in the gas phase should also have a high surface area to volume ratio, a good mechanical stability and a low pressure drop over the reactor cross section. The patents teach that all these conditions, including enhanced diffusion properties, would be fulfilled by using shaped catalyst bodies with a cylindrical geometry with three internal continuous holes which are symmetrically located over the cross section of the cylindrical body, while their centers form an equilateral triangle. Regarding the external sidewall of the cylindrical body, the patents either propose a trilobe structure with notches or a prismatic shape with rounded vertices. It is emphasized that both shapes also show a high heat exchange coefficient, which would be advantageous for highly exothermic reactions. All trilobe-shaped catalysts disclosed in the patents show a smaller spacing between two adjacent holes than between a continuous hole and the outer surface of the catalyst body. Irregular spacing leads to inhomogeneous diffusion lengths and mechanical weak spots.

The described catalyst bodies already combine several geometric features which enable an improved performance over the state of the art cited in the paragraphs above. Nevertheless, there is no teaching which of the two alternative shapes is to be preferred. Irrespective of that, a further general problem of the described shapes is the problem of stacked packing, as already pointed out for US 2011/0,257,413 above, due to their flat top and bottom surfaces.

Regarding the technological focus, U.S. Pat. Nos. 5,330,958 and 5,326,915 refer to the oxidation of methanol to formaldehyde, and U.S. Pat. No. 5,861,535 to the oxychlorination of ethene to 1,2-dichloroethane.

US 2004/0,133,052 picked up the idea mentioned in U.S. Pat. Nos. 5,330,958, 5,326,915 and 5,861,535 and describes the use of three-lobed catalysts with three internal continuous holes for the hydrogenation of unsaturated hydrocarbons.

US 2009/0,306,410 also picked up the idea mentioned in U.S. Pat. Nos. 5,330,958, 5,326,915 and 5,861,535 and describes the use of three-lobed VPO catalysts with three internal continuous holes as well as the use of prismatic shaped VPO catalysts with rounded vertices and three internal continuous holes for the oxidation of n-butane to maleic anhydride. Both catalyst bodies are rated as preferred embodiments without giving one of them preference. Both are described to have a high mechanical stability, to give a high yield of maleic anhydride and to have short diffusion paths enabling a high degree of pore utilization.

A disadvantage of the shapes specifically described in US 2009/0,306,410 by graphic reference is their varying wall thickness due to a relatively massive section in the middle of the shaped bodies causing relatively higher transport limitations in this central part of the shaped catalyst bodies. This may negatively impact the reaction performance. Varying wall thicknesses within a single shape typically lead to weaker areas within the shape. Furthermore, these relatively unbalanced geometries may impact the powder feeding process during the tableting process with negative consequences for mechanical stability or pore structure of the shaped catalyst bodies. In addition to that that, the relatively massive section in the middle of the shaped catalyst bodies may provide a negative impact on pressure drop along a packed catalyst bed. Finally, the general problem of the described shapes regarding a stacked packing due to their flat top and bottom surfaces, is also present.

WO 2019/170,406 relates to the oxidation of sulfur dioxide to sulfur trioxide and describes a shaped catalyst body in the form of a tetralobe having four internal continuous holes in which their midpoints form a regular square. Such tetralobes have a shape similar to a four-leaf clover. Such a geometry has a large external surface area in relation to its body volume, larger than a geometry with an essentially circular cross section as disclosed in US 2011/0,257,413, and shows a low pressure drop over the reactor cross section. The specific finding in WO 2019/170,406 was that the lateral compression strength of the moist, freshly extruded catalyst body as well as of the calcined catalyst body is considerably higher if the spacings of two adjacent continuous holes and those between the continuous holes and the outer surface of the catalyst body are essentially equal, compared to a catalyst body in which the spacings between two adjacent continuous holes are smaller than those between a continuous hole and the outer surface of the catalyst body. A high lateral compression strength is advantageous during the catalyst manufacture by extrusion and also for the handling of the calcined catalyst body.

Even if the described catalyst body has a tetralobe structure and essentially equal spacings between two adjacent continuous holes and between the continuous holes and the outer surface of the catalyst body, the body volume in the middle of the cross section of the tetralobe structure is still hardly accessible and therefore does only barely contribute to the catalytic reaction. This has a negative impact on the reaction performance. Furthermore and similar to the disadvantages described for the catalyst shapes disclosed in US 2009/0,306,410, such a relatively unbalanced geometry may impact the powder feeding process during the tableting process with negative consequences for mechanical stability or pore structure of the shaped catalyst bodies. Additionally, the relatively massive section in the middle of the shaped catalyst bodies may provide a negative impact on pressure drop along a packed catalyst bed. Finally, with catalyst shapes to be used in relatively thin tubes with inner diameters of typically 20 to 35 mm such as used in many selective oxidation processes, there is also the general challenge of scaling down the shape to a size small enough for a reasonably homogeneous catalyst bed packing, which avoids excessive channeling or by-passing of reaction fluent.

PCT/EP2019/078,696 describes a silver containing shaped catalyst body with a lobed geometry for the gas-phase oxidation of ethylene to ethylene oxide, having a cylindrical structure with n-fold spaces and n holes extending from one flat cover side to the other, whereby each hole is assigned to a lobe, and n is 2, 3, 4, 5 or 6.

The state of the art cited above shows that a variety of different shapes of catalyst bodies for heterogeneously catalyzed gas-phase oxidations of hydrocarbons have already been investigated and their influence on important properties and parameters has been illustrated. It was shown that, for a given active mass, the shape of the catalyst body has a great influence on (a) the ratio of the body volume to the surface area, (b) the mechanical stability like the lateral compression strength or the abrasion resistance, (c) the length and efficiency of the diffusion paths inside the body volume, (d) the efficiency of the heat exchange, and last but not least (e) the pressure drop over the reactor cross section during the gas-phase reaction.

It was recognized according to the invention that variations in the shape of the catalyst body which positively affect one or more properties or parameters may negatively affect others. Although various improvements by adjusting macroscopic textures of the shaped catalyst bodies have already been presented in the state of the art, there might still be some room for further improvements.

It is an object of the present invention to provide a shaped catalyst body for the catalytic conversion of organic compounds in the gas-phase in fixed-bed reactors which does no more or only in a minor degree show the abovementioned disadvantages, and which enables a high conversion, a high yield, a high selectivity and a long catalyst lifetime. In particular, the mechanical stability, the packing density per reactor volume, the efficiency of the diffusion paths inside the body volume, the packing density in a typical reactor tube, and the efficiency of the heat exchange of the shaped catalyst body shall be preferably high, and the ratio of the body volume to the surface area, the pressure drop over the reactor cross section during the gas-phase reaction, the formation of fragments during the handling of the catalyst and its filling into the reactor, and its abrasion shall be preferably low. It is a particular objective of the present invention to provide a shaped catalyst body to be used in a catalyst bed in relatively confined space such as reactor tubes with inner diameters of 20 to 40 mm such as often used in selective gas-phase oxidation reactions. Furthermore, the shaped catalyst body shall be easy to produce by using convention methods and apparatuses, except for minor adjustments.

It is a further object of the present invention to provide a process for the preparation of the shaped catalyst body of the present invention Moreover, it is also an object of the present invention to provide a reactor tube filled with shaped catalyst bodies suitable for its use in the conversion of organic compounds.

Finally, it is also an object of the present invention to provide a process for the production of an oxidized organic compound by an heterogeneously catalyzed gas-phase oxidation of an organic compound, such as acrolein or acrylic acid from propene, or maleic anhydride from n-butane, with a high yield and a high selectivity.

BRIEF DESCRIPTION OF FIGURES

FIG. 1a shows a horizontal (cross-sectional) view of the shaped catalyst body, illustrating the three-lobed structure and three continuous holes.

FIG. 1b shows a vertical (longitudinal) section of the catalyst body, illustrating the outwardly curved top and bottom covers.

FIG. 2a depicts shapes of outwardly curved arches according to an embodiment.

FIG. 2b depicts shapes of outwardly curved arches according to an embodiment.

FIG. 3a shows shapes of outwardly curved arches according to an embodiment.

FIG. 3b shows shapes of outwardly curved arches according to an embodiment.

FIG. 3c shows shapes of outwardly curved arches according to an embodiment.

FIG. 4a shows shapes of the notches of the three-lobed structure according to an embodiment.

FIG. 4b shows shapes of the notches of the three-lobed structure according to an embodiment.

FIG. 4c shapes of the notches of the three-lobed structure according to an embodiment.

FIG. 5a shows a perspective view of a catalyst body embodiment.

FIG. 5b shows an oblique view of the upright catalyst body.

FIG. 5c shows a top view of the catalyst body cover.

FIG. 6 shows a simulation of characteristic properties for various catalyst body shapes.

FIG. 7 shows a simulation of packed beds for various catalyst body shapes.

FIG. 8 shows an evaluation of characteristic properties.

FIG. 9 shows properties of the shaped catalyst bodies.

FIG. 10 shows a simulation of packed beds in 26 mm tube.

FIG. 11 shows an evaluation of characteristic properties.

We have surprisingly found a shaped catalyst body for heterogeneously catalyzed reactions of organic compounds in the gas-phase in fixed-bed reactors, wherein the shaped catalyst body is characterized by (a) containing at least one element from group 3 to 12 of the Periodic Table of the Elements, whereby the total amount of the elements from group 3 to 12 of the Periodic Table of the Elements is 0.01 to 85 wt.-%;

(b) a cylindrical structure with a top cover (A), a bottom cover (B) and a lateral surface (C) with three notches running in the cylinder periphery along the cylinder height forming a three-lobed structure;

(c) three continuous essentially circular holes as void spaces with a diameter $d_1$ and a tolerance of $d_1$ for each hole of 15% based on the shortest diameter of the respective hole, running from one cover side to the other cover side, wherein each hole is assigned to one lobe and wherein the midpoints of the three holes are arranged essentially equidistantly over the horizontal cross section of the cylindrical structure with a tolerance of 15% based on the shortest distance between two midpoints of two holes;

in which (d) the wall thickness $d_2$ between two continuous holes over the horizontal cross section of the cylindrical structure at the imaginary connection line between the midpoints of the two continuous holes is essentially the same for all three walls between two continuous holes with a tolerance of $d_2$ of 15% based on the shortest wall thickness;

(e) for each of the three lobes, the wall thickness $d_3$ between a continuous hole and the lateral surface is, within a 180° segment, which is defined as the segment over a horizontal cross section of the cylindrical structure, whose chord is parallel to the imaginary connection line between the two midpoints of the adjacent two continuous holes, essentially constant within the respective segment and essentially the same for all three segments of the three lobes with a tolerance of $d_3$ of 15% based on the shortest wall thickness;

(f) the ratio of each of the three wall thicknesses $d_2$ to each of the three wall thicknesses $d_{3x}$, whereby $d_{3x}$ are the wall thicknesses located over a horizontal cross section of the cylindrical structure at the extension of the imaginary connection lines between the central midpoint of the cylinder and the midpoint of the continuous hole of the respective lobe, is 0.9 to 1.1;

(g) the top cover (A) and the bottom cover (B) have outwardly curved arches with the highest height $h_2$ for the top cover (A) and the highest height $h_3$ for the bottom cover (B), wherein $h_2$ is the distance between the imaginary plane top cover area of an imaginary circular cylinder (D) comprising a circular lateral surface which just encircles the three lobes of the shaped catalyst body, whereby the imaginary plane top cover area contacts the circular lateral surface at a right angle at the highest horizontal level at which the circular lateral surface of the imaginary circular cylinder (D) just contacts at least one lobe; and the highest height of the top cover (A) above the imaginary plane top cover area, measured perpendicular to the imaginary plane top cover area;

$h_3$ is the distance between the imaginary plane bottom cover area of the imaginary circular cylinder (D) comprising a circular lateral surface which just encircles the three lobes of the shaped catalyst body, whereby the imaginary plane bottom cover area contacts the circular lateral surface at a right angle at the lowest horizontal level at which the circular lateral surface of the imaginary circular cylinder (D) just contacts at least one lobe; and the highest height of the bottom cover (B) above the imaginary plane bottom cover area, measured perpendicular to the imaginary plane bottom cover area; and the imaginary circular cylinder (D) has the height $h_1$ measured as the distance between the imaginary plane top cover area and the imaginary plane bottom cover area; and (h) the diameters $d_1$ are independently of one another from 1 to 5 mm, the wall thicknesses $d_2$ and $d_3$ are independently of one another 0.5 to 3 mm, the heights $h_2$ and $h_3$ are independently of one another 0.2 to 3 mm, and the height $h_1$ is 2 to 10 mm.

This shaped catalyst body is characterized by its material as defined by feature (a) and its specific geometric shape as defined by features (b) to (h).

According to feature (a), the shaped catalyst body of the invention contains at least one element from group 3 to 12 of the Periodic Table of the Elements, whereby the total amount of the elements from group 3 to 12 of the Periodic Table of the Elements is 0.01 to 85 wt.-%. These elements can be present in versatile chemical forms, including metallic forms and ionic forms. Metallic forms are for example metals including alloys, and ionic forms are for example oxides and any other salts. Preferably, the elements comprise at least one element of Sc, Y, La, Ti, Zr, Hf, V, Nb, Ta, Cr, Mo, W, Mn, Re, Fe, Ru, Os, Co, Rh, Ir, Ni, Pd, Pt, Cu, Ag and Zn, more preferably at least one element of Zr, V, Nb, Mo, W, Fe, Co, Ni, Pd, Pt, Cu, Ag and Zn, and particularly preferably at least one element of V, Nb, Mo, Fe, Co, Ni, Pd, Pt, Cu, Ag and Zn.

Beside the elements from group 3 to 12 of the Periodic Table of the Elements, also other elements are present and complete the percentage of the composition to 100%. Basically, these are elements from groups 1 to 2 and 13 to 17 of the Periodic Table of the Elements, such as for example H, Na, K, Mg, Ca, Ba, B, Al, C, Si, Sn, N, P, Ge, Sb, Bi, O, S or Cl. These can, for example, be part of the catalytically active main component, such as phosphorus in VPO catalysts or chlorine in $CuCl_2$ catalysts, be promotors, such as bismuth, or be part of carrier materials, such as Al for $Al_2O_3$ carriers or Si for $SiO_2$ carriers. Furthermore, also alkali metals and alkaline earth metals can be present. Finally, also lubricants like graphite can be present. A further lubricant can also be Cu powder, whereby Cu is already an element of group 11 of the Periodic Table of the Elements. Lubricants support the tableting of the shaped catalyst bodies.

Depending on its composition and structure, the shaped catalyst body of the invention can be widely used for catalyzing a variety of different reactions of various organic compounds. For example, the shaped catalyst body can be a supported catalyst, in which the catalytically active component is impregnated or otherwise deposited on a carrier material, an full body catalyst, which is more or less fully made of the catalytically active component, or be any type between. Possible carrier materials for supported catalysts can be any carrier materials which can be shaped into the intended shape and which are useful as carrier material for catalysts. Typical carrier materials are for example $Al_2O_3$, $SiO_2$, MgO, $TiO_2$ or $ZrO_2$ and the like, but also other carrier materials may be used.

Without limiting the scope, the following list contains some catalytically active materials which are typically used as main components for certain reactions of organic compounds. Possible promotors and adjuvants such as lubricants are intentionally omitted in the below listing, but shall not be excluded.

Noble metals such as Pt or Pd on a carrier material such as $Al_2O_3$ (e.g. for the hydrogenation of unsaturated hydrocarbons).

Ag on a carrier material such as $Al_2O_3$ (e.g. for the oxidation of ethylene to ethylene oxide).

$CuCl_2$ on a carrier material such as $Al_2O$ (e.g. for the oxychlorination of hydrocarbons).

$(VO)_2P_2O_7$ (e.g. for the oxidation of n-butane to maleic anhydride).

V—Mo-oxides (e.g. for the oxidation of benzene to maleic anhydride).

Mixed metal oxides containing at least Mo, Fe and Bi, $CoMoO_4$, $Fe_2(MoO_4)_3$ or Bi—Mo-oxides (e.g. for the oxidation of propene to acrolein or of isobutene to methacrolein).

Co—Mo-oxides or Mo—V-oxides (e.g. for the oxidation of acrolein to acrylic acid or of methacrolein to methacrylic acid).

Ag on a carrier material such as $Al_2O_3$ (e.g. for the oxidation of methanol to formaldehyde).

Fe—Mo—V-oxides (e.g. for the oxidation of methanol to formaldehyde).

$V_2O_3$ (e.g. for the oxidation of sulfur dioxide to sulfur trioxide).

Catalysts in which Pt or Pd are the major catalytically active components, preferably only contain 0.01 to 1 wt.-%, more preferably ≥0.02 wt.-%, particularly preferably ≥0.05 wt.-%, and more preferably ≤0.8 wt.-% and particularly preferably ≤0.5 wt.-% of these metals. They are preferably supported catalyst in which the noble metal is impregnated on a carrier material. Preferred carrier materials are $Al_2O_3$ and alumina oxide-based materials. However, other carrier materials such as those known in the state of the art are generally also applicable.

Irrespective of the above-mentioned catalysts in which noble metals such as Pt or Pd are the major catalytically active components and which are characterized by a low content of Pt and Pd, a shaped catalyst body is preferred which preferably contains ≥1 wt.-%, more preferably ≥5 wt.-%, particularly preferably ≥10 wt.-%, and preferably ≤80 wt.-% and more preferably ≤75 wt.-% as the total amount of the group 3 to 12 elements of the Periodic Table of the Elements.

Catalysts in which elementary metals other than Pt or Pd, such as Cu or Ag are the major catalytically active components, as well as catalysts in which one or more group 3 to 12 elements of the Periodic Table of the Elements are present in ionic form other than oxides, are also preferably supported catalyst in which the active compounds are impregnated or otherwise deposited on a carrier material. As examples, Ag on $Al_2O_3$ and $CuCl_2$ on $Al_2O_3$ are mentioned. Besides $Al_2O_3$ also other carrier materials such as those known in the state of the art are generally also applicable. The total amount of the group 3 to 12 element or elements of the Periodic Table of the Elements for such catalysts is preferably ≥1 wt.-%, more preferably ≥5 wt.-%, particularly preferably ≥10 wt.-%, and preferably ≤50 wt.-%, more preferably ≤40 wt.-% and particularly preferably ≤30 wt.-%. The supported catalysts may also contain promotors, lubricants and any other adjuvants. As one possible example relating to the above-mentioned $CuCl_2$ containing catalyst, the presence of KCl besides $CuCl_2$ in oxychlorination catalysts is mentioned.

Another important group of catalysts for which the shaped catalyst body of the invention is of specific interest is the group of full body catalysts, in which the shaped catalyst body is more or less fully made of the catalytically active component. Such full body catalysts mainly contain one or more group 3 to 12 elements of the Periodic Table of the Elements in oxidic form. The term oxidic form also includes mixed oxides with other metal and non-metal compounds such as P. The total amount of one or more group 3 to 12 elements of the Periodic Table of the Elements for such catalysts is preferably ≥10 wt.-%, more preferably ≥20 wt.-%, particularly preferably ≥25 wt.-%, and preferably ≤80 wt.-% and more preferably ≤75 wt.-%. As group 3 to 12 elements of the Periodic Table of the Elements, V, Nb, Mo, Fe, Co, Ni and Zn are preferred. Also the full body catalysts may also contain promotors, lubricants and any other adjuvants.

Particularly preferably, the shaped catalyst body of the invention contains an oxidic material comprising vanadium and phosphorus and very particularly preferably vanadyl pyrophosphate.

Regarding the material of the shaped catalyst body, its volume is expressed as "body volume" and its density is expressed as "body density". Being more specific, the "body volume" is defined as the macroscopic volume including the pores. For the sake of completeness, it is emphasized that the continuous essentially circular holes as specified in feature (c) as well as any surface structures like grooves, notches or jags are not part of the macroscopic volume. In analogy to that, the "body density" is defined as the ratio between the mass of the particle and its body volume.

The material from which the shaped catalyst body is made of, irrespective of being a supported catalyst, an full body catalyst or any type between, and irrespective of containing the active component in metallic form of ionic form such as an oxide or any other salt, usually has a body density of 1 to 15 $g/cm^3$, preferably of ≥1 $g/cm^3$ and preferably of ≤10 $g/cm^3$, more preferably of ≤8 $g/cm^3$ and particularly preferably of ≤5 $g/cm^3$.

The geometric shape of the shaped catalyst body is defined by features (b) to (h). FIG. 1 shows a structured drawing of one possible embodiment of the shaped catalyst body of the invention for illustration purpose. It shows in view a) a horizontal gross section and in view b) a vertical gross section. The bold lines indicate the external shape whereas the dotted lines are reference lines. The labels comply with the naming in the claims. Capital letters refer to surfaces and small letters to spacings and dimensions.

The basic shape of the shaped catalyst body, which is defined by feature (b), is a cylindrical structure with a top cover (A), a bottom cover (B) and a lateral surface (C) with three notches running in the cylinder periphery along the cylinder height forming a three-lobed structure. The three-lobed structure with the three notches is easily visible in the horizontal cross section shown in FIG. 1 *a*). The three notches are shown as the three V-shaped notches.

Beside the cylindrical structure and as defined in feature (c), the shaped catalyst body contains three continuous essentially circular holes as void spaces with a diameter $d_1$ and a tolerance of $d_1$ for each hole of 15% based on the shortest diameter of the respective hole, running from one cover side to the other cover side, wherein each hole is assigned to one lobe and wherein the midpoints of the three holes are arranged essentially equidistantly over the horizontal cross section of the cylindrical structure with a tolerance of 15% based on the shortest distance between two midpoints of two holes. In FIG. 1 *a*), the midpoints of the holes are indicated as small dots and the diameter $d_1$ is exemplary shown for one hole as a double arrow.

Continuous means that each hole has two openings and an essentially straight passage between the two openings. The three holes are directed such that they are running in vertical direction from one cover side to the other cover side of the cylinder. The holes are essentially parallel to the lateral surface (C).

The horizontal gross section of each hole is essentially circular. The term "essentially circular" encompasses an exact circular geometry as well as a deviation from an exact circular geometry, such as for example a slight oval geometry, a slight conical form in vertical direction, or a regular or irregular geometry with jags, notches or grooves and the like, within a tolerance of the diameter $d_1$ for each hole of 15% based on the shortest diameter of the respective hole. The shortest diameter of a hole is in turn the shortest straight distance across the midpoint within the respective hole. The tolerance is preferably 10%, more preferably 8%, particularly preferably 5% and very particularly preferably 3% based on the shortest diameter of the respective hole. A slight conical form of the holes reduces the ejection force on the tableted body by the pressing tools after the compaction of the shaped catalyst body in a tableting machine and thus enables a more favorable preparation process.

The diameter $d_1$ of a hole is the average of the diameters across the vertical extension of the respective hole, whereas the diameter at a horizontal gross section is the average of the straight distances across the midpoint at such horizontal gross section. In case of an exact circular hole, the diameters of each horizontal gross section as well as the diameters across the vertical extension of the hole are all the same so that the diameter $d_1$ equals the diameters measured at the openings.

The three continuous essentially circular holes are located such that each hole is assigned to one lobe of the three-lobed structure and the midpoints of the three holes are arranged essentially equidistantly over the horizontal cross section of the cylindrical structure with a tolerance of 15% based on the shortest distance between two midpoints of two holes. Hence, the midpoints of the three holes are located at the corners of an essentially equilateral triangle. The tolerance indicates that one or two of the three distances between two midpoints may be up to 15% longer than the shortest distance between two midpoints in the triangle arrangement. The tolerance is preferably 10%, more preferably 8%, particularly preferably 5% and very particularly preferably 3% based on the shortest distance.

One important feature of the shaped catalyst body of the invention is feature (d), which relates to the wall thickness $d_2$ between two continuous holes. According to that feature, the wall thickness $d_2$ between two continuous holes over the horizontal cross section of the cylindrical structure at the imaginary connection line between the midpoints of the two continuous holes is essentially the same for all three walls between two continuous holes with a tolerance of $d_2$ of 15% based on the shortest wall thickness. The wall thickness $d_2$ between two continuous holes is the average of the wall thickness across the vertical extension of the respective holes. For illustration purpose, the wall thickness $d_2$ of a wall between two holes as well as the imaginary connection line between the midpoints of these two holes are exemplary indicated in FIG. 1 a).

The term "essentially the same" encompasses exactly equal wall thicknesses as well as two or three different wall thicknesses. The tolerance for each wall thickness $d_2$ is 15%, preferably 10%, more preferably 8%, particularly preferably 5% and very particularly preferably 3% based on the shortest wall thickness.

Another important feature of the shaped catalyst body of the invention is feature (e), which relates to the wall thickness $d_3$ between the continuous hole and the lateral surface. According to that feature, for each of the three lobes, the wall thickness $d_3$ between a continuous hole and the lateral surface is, within a 180° segment, which is defined as the segment over a horizontal cross section of the cylindrical structure, whose chord is parallel to the imaginary connection line between the two midpoints of the adjacent two continuous holes, essentially constant within the respective segment and essentially the same for all three segments of the three lobes with a tolerance of $d_3$ of 15% based on the shortest wall thickness. The wall thickness $d_3$ between a continuous hole and the lateral surface is the average of the wall thickness across the vertical extension and within the 180° segment of the respective hole. For illustration purpose, FIG. 1 a) shows a reference line indicating such a 180° segment, an imaginary connection line between the two midpoints of the adjacent two continuous holes, to which the 180° segment reference line is parallel, and double arrows indicating the wall thicknesses $d_3$ within this 180° segment. One specific wall thickness within this 180° segment in FIG. 1 a) is denoted as $d_{3x}$, which also is part of $d_3$ but at a specific geometric location. $d_{3x}$ is further described below together with feature (f).

The terms "essentially constant" and "essentially the same" encompass exactly equal wall thicknesses as well as varying wall thicknesses within the mentioned tolerance. The tolerance for each wall thickness $d_3$ is 15%, preferably 10%, more preferably 8%, particularly preferably 5% and very particularly preferably 3% based on the shortest wall thickness.

A further important feature of the shaped catalyst body of the invention is feature (f), which relates to a ratio of the wall thicknesses $d_2$ to the wall thicknesses $d_{3x}$, whereby the wall thicknesses $d_{3x}$ are the wall thicknesses located over a horizontal cross section of the cylindrical structure at the extension of the imaginary connection lines between the central midpoint of the cylinder and the midpoint of the continuous hole of the respective lobe. According to feature (f), the ratio of the wall thicknesses $d_2$ to the wall thicknesses $d_3a$ is 0.9 to 1.1. One of the three wall thicknesses $d_2$ and one of the three wall thicknesses $d_{3x}$ are exemplary shown in FIG. 1 a). The ratio relates to all nine possible fractions $d_2/d_{3x}$, since there are three wall thicknesses $d_2$ and three wall thicknesses $d_{3x}$.

The ratio $d_2/d_{3x}$ is preferably ≥0.95, more preferably ≥0.98 and particularly preferably ≥0.99, and preferably ≤1.05, more preferably ≤1.02 and particularly preferably ≤1.01, notably 1.

The above-mentioned features (b) to (f) define the geometry across the horizontal cross section of the shaped catalyst body by specifying their three-lobed structure, the diameters $d_1$ of the continuous essentially circular holes and the wall thicknesses $d_2$ and $d_3$. By these data, the geometry across the horizontal cross section is clearly and completely defined. However, a further practical horizontal dimension is the outer diameter $d_0$. The outer diameter $d_0$ is the diameter of the smallest circle, which just encircles the shaped catalyst body over the horizontal cross section. FIG. 1 a) also shows such an encircling circle as a dotted circle around the three lobes. Its diameter is denoted as $d_0$.

In case of an exact equilateral triangle of the midpoints of the three holes, equal values of $d_1$, equal values of $d_2$ and equal values of $d_3$, the outer diameter $d_0$ can easily be calculated by the following formula $$d_0 = 2d_3 + d_1 + \frac{d_1 + d_2}{\cos 30°}. \quad (1)$$

It was surprisingly found that, based on the geometric features (b) to (f), outwardly curved arches at the top cover (A) and the bottom cover (B) enable in one and the same shaped catalyst body a high mechanical stability, highly efficient diffusion paths inside the body volume, a high packing density in a typical reactor tube, a highly efficient heat exchange between the bulk and its neighborhood, as well as a low ratio of the body volume to the surface area, a low pressure drop over the reactor cross section during the gas-phase reaction and a low abrasion.

Accordingly, the essential feature (g) relates to a top cover (A) and a bottom cover (B) with outwardly curved arches with the highest height $h_2$ for the top cover (A) and the highest height $h_3$ for the bottom cover (B), wherein $h_2$ is the distance between
- the imaginary plane top cover area of an imaginary circular cylinder (D) comprising a circular lateral surface which just encircles the three lobes of the shaped catalyst body, whereby the imaginary plane top cover area contacts the circular lateral surface at a right angle at the highest horizontal level at which the circular lateral surface of the imaginary circular cylinder (D) just contacts at least one lobe; and
- the highest height of the top cover (A) above the imaginary plane top cover area, measured perpendicular to the imaginary plane top cover area;

$h_3$ is the distance between
- the imaginary plane bottom cover area of the imaginary circular cylinder (D) comprising a circular lateral surface which just encircles the three lobes of the shaped catalyst body, whereby the imaginary plane bottom cover area contacts the circular lateral surface at a right angle at the lowest horizontal level at which the circular lateral surface of the imaginary circular cylinder (D) just contacts at least one lobe; and
- the highest height of the bottom cover (B) above the imaginary plane bottom cover area, measured perpendicular to the imaginary plane bottom cover area; and the imaginary circular cylinder (D) has the height $h_1$ measured as the distance between the imaginary plane top cover area and the imaginary plane bottom cover area.

A vertical cross section of a shaped catalyst body of the invention is shown in FIG. 1 b). It refers to the same three-lobed structure as shown in FIG. 1 a). Again, bold lines indicate the external shape whereas the dotted lines are reference lines. It illustrates how the outwardly curved arches of the top cover (A) and a bottom cover (B) can look like. Furthermore, the imaginary circular cylinder (D), which is shown in dotted lines, also illustrates the imaginary plane top and bottom cover areas, indicated as dotted horizontal lines, as the upper and lower margins for the height $h_1$. The heights $h_2$ and $h_3$ are shown as dotted arrows above and below the imaginary plane top and bottom cover areas.

Similar to the outer diameter $d_0$ as a practical dimension, also the total height $h_0$ is a practical dimension since it could also be easily measured. It is the sum of $h_1$, $h_2$ and $h_3$ as shown in the below equation $$h_0 = h_1 + h_2 + h_3. \tag{2}$$

The outwardly curved arches of the shaped catalyst body of the invention can have different geometric shapes. The common feature of these outwardly curved arches is their arched shape. This arched shape can, for example, have the shape of one coherent arc over the respective cover, or be partitioned into separate arcs over the different walls of the three-lobed structure. Although it is possible that the top cover (A) and the bottom cover (B) have differently shaped outwardly curved arches, it is preferred that the two covers have, at least more or less, and particularly largely the same shapes.

In one preferred embodiment of the shaped catalyst body, at least one of the two outwardly curved arches has a convex shape over the respective cover, and more preferably both outwardly curved arches have a convex shape over the respective cover. Convex means that the respective arching has the shape of a chord. The diameter of the circle, from which the chord is derived, is defined by the height of the respective cover, meaning $h_2$ for the top cover (A) and $h_3$ for the bottom cover (B). FIG. 2 a) shows a vertical cross section over such a convexly shaped cover as an illustrating example.

In another preferred embodiment of the shaped catalyst body, at least one of the two outwardly curved arches has a compressed convex shape over the respective cover, and more preferably both outwardly curved arches have a compressed convex shape over the respective cover. Compressed convex means that the basic shape was a convex shape which has been compressed in vertical direction.

In analogy to a compressed convex shape, the convex shape can also be stretched. Therefore, in a further preferred embodiment of the shaped catalyst body, at least one of the two outwardly curved arches has a stretched convex shape over the respective cover, and more preferably both outwardly curved arches have a stretched convex shape over the respective cover. Stretched convex means that the basic shape was a convex shape which has been stretched in vertical direction.

A convex or convex-based shape of the cover is only one possible basic form of a coherent arc over the respective cover. In a further, also preferred embodiment of the shaped catalyst body, at least one of the two outwardly curved arches has the shape of a compressed semicircle over the respective cover, and more preferably both outwardly curved arches have the shape of a compressed semicircle over the respective cover. Compressed semicircle means that the basic shape was a semicircle with the diameter $d_0$, which has been compressed in vertical direction. FIG. 2 b) shows a vertical cross section over such a compressed semicircularly shaped cover as an illustrating example.

FIG. 2 a) and b) also show the inner angle α at the edge at which the lateral surface of the imaginary circular cylinder (D) contacts the outwardly curved arching. It can easily be determined by measuring the outside angle β at the edge at which the lateral surface of the imaginary circular cylinder (D) contacts the outwardly curved arching, which is the complementary angle to a and from which α can easily be calculated according to the below equation $$\alpha = 360° - \beta. \tag{3}$$

The angle α is >900 and generally ≤180°. It is preferably ≥100°, more preferably ≥110° and particularly preferably ≥120°, and preferably ≤170° and more preferably ≤160°. Particularly preferred is a shaped catalyst body at which the inner angles α at the edges at which the lateral surface of the imaginary circular cylinder (D) contacts the outwardly curved arching of the top cover (A) and the outwardly curved arching of the bottom cover (B) are independently of one another 120 to 160°.

As already mentioned before, the outwardly curved arches can, for example, also be partitioned into separate arcs over the different walls of the three-lobed structure. In one embodiment of this type, at least one of the two outwardly curved arches is partitioned in a way that each partition wall between a hole and the outer surface and between two holes is rounded to both edges. The rounded partition walls can have different geometric shapes. In one embodiment, for example, they can have convex shapes as shown in FIG. 3 a) or compressed or stretched convex shapes, or in another embodiment, for example, they can have the shape of semicircles as shown in FIG. 3 b), or in a further embodiment, for example, they also can have the shape of a compressed semicircles as shown in FIG. 3 c). The before-mentioned shapes are, of course, non-limiting examples.

In addition to the shapes of the rounded partition walls, also the arc which overarches the rounded partition walls can have different geometric shapes. For example, it can have a convex shape as shown in FIGS. 3 a) and 3 c), a compressed or stretched convex shape or a compressed semicircle as shown in FIG. 3 b). The before-mentioned shapes are also only non-limiting examples.

In case of such a partitioning into separate arcs, usually both covers of the shaped catalyst body are partitioned in the same way.

Moreover, it may be advantageous in the manufacture of the shaped catalyst body to leave some offset between the outwardly curved arches and the edges where the vertical periphery of the three-lobed structure meet the cover sides. In case of such an offset, the outwardly curved arches do not directly contact the vertical peripheries of the three-lobed structure but are slightly recessed and a flat surrounding area is present between the outwardly curved arches and edges where the vertical periphery of the three-lobed structure meets the cover sides. Such an offset may also be present between the outwardly curved arches and the edges where the essentially circular holes meet the cover sides.

If the shaped catalyst body of the invention contains an offset of the outwardly curved arches, either towards the vertical periphery of the three-lobed structure or towards the essentially circular holes or towards both, the width of the flat surrounding area is then preferably $\leq(0.2 \times d_2)$ and more preferably $\leq(0.1 \times d_2)$. If there is no offset, there is—of course—also no flat surrounding area and the numerical value for its width would be $0 \times d_2$.

Beside the nature of the material, of which the shaped catalyst body is at least partly made of, and beside the geometric shape of the shaped catalyst body, the shaped catalyst body of the invention is also characterized by its dimensions. Feature (h) relates to the dimensions of $d_1$, $d_2$, $d_3$ and $h_1$, $h_2$, $h_3$.

The diameters $d_1$ are independently of one another from 1 to 5 mm, preferably ≥1.5 mm, more preferably ≥1.8 mm and particularly preferably ≥2 mm, and preferably ≤4 mm and more preferably ≤3 mm.

The wall thicknesses $d_2$ and $d_3$ are independently of one another 0.5 to 3 mm, preferably ≥0.8 mm, more preferably ≥0.9 mm and particularly preferably ≥1 mm, and preferably ≤2.5 mm, more preferably ≤2 mm and particularly preferably ≤1.8 mm.

Accordingly, the outer diameter $d_0$, which is the diameter of the smallest circle, which just encircles the shaped catalyst body over the horizontal cross section, is from 3.7 to 20 mm, preferably ≥4 mm and more preferably ≥5 mm, and preferably ≤15 mm, more preferably ≤12 mm and particularly preferably ≤10 mm.

The heights $h_2$ and $h_3$ are independently of one another 0.2 to 3 mm, preferably ≥0.3 mm and more preferably ≥0.4 mm, and preferably ≤2.5 mm, more preferably ≤2 mm and particularly preferably ≤1.5 mm.

The height $h_1$ is 2 to 10 mm, preferably a 3 mm and more preferably ≥4 mm, and preferably ≤9 mm, more preferably ≤8 mm and particularly preferably ≤7 mm.

Accordingly, the total height $h_0$, which is the sum of $d_1$, $d_2$ and $d_3$, is from 2.4 to 16 mm, preferably ≥3 mm, more preferably ≥4 mm and particularly preferably ≥5 mm, and preferably ≤15 mm, more preferably ≤12 mm and particularly preferably ≤10 mm.

Particularly preferred is a shaped catalyst body with an outer diameter $d_0$ of 5 to 15 mm and a total height $h_0$ of 4 to 12 mm.

As described in feature (b), the lateral surface (C) has three notches running in the cylinder periphery along the cylinder height forming a three-lobed structure. The simplest geometric form of those notches is shown in FIG. 1 a). They have the form of V-shaped notches with a vertical center line at the intersection of two adjacent circles which form the lobed-structure. Such V-shaped notches enable even at the intersections of two adjacent circles of the lobed structure highly efficient diffusion paths and a highly efficient heat exchange.

Although such V-shaped notches already show various advantages, it was surprisingly found that a slight flattening of the V-shape at the intersection noticeably increases the mechanical stability of the shaped catalyst body, whereas the diffusion properties, the heat exchange and the ratio of the body volume to the surface area only insignificantly diminish. Based on the above finding, a shaped catalyst body is preferred, at which the inner area of the notches at the lateral surface between two adjacent lobes, which is defined as the area between the imaginary vertical lines, at which the chords of the imaginary 180° segments as specified in feature (e) cross the lateral surface of the lobes, is at least partly filled with the oxidic material as specified in feature (a).

FIG. 4 a) shows a horizontal cross section of a shaped catalyst body as an example of such an embodiment. At this embodiment, the inner area of the notches between the imaginary vertical lines, at which the chords of the imaginary 180° segments cross the lateral surface of the lobes, are filled and shows at the inner area an even lateral surface. In the horizontal cross section as shown in FIG. 4 a), these fillings are indicated by straight lines between two adjacent points at which the imaginary 180° segments cross the lateral surface.

In another and more preferred embodiment, the filling of the notches at the lateral surface has a concave shape. The horizontal cross section of such a shaped catalyst body is shown in FIG. 4 b). Preferably, the transitions between the circle segments of the respective lobes and the concavely shaped circle segments of the fillings are smooth and more preferably formed as wavy lines.

It is expressly mentioned that the shapes of the fillings of the V-shaped notches are not restricted to the above-mentioned shapes and that also other shapes which deviate from straight lines and concave circle segments can be applied. Without limitation, such shapes include compressed or stretched circle segments as well as any other shapes. Furthermore, it is also expressly mentioned that also only a part of the surface of the inner area is covered by such a filling. FIG. 4 c) shows for illustration purpose an example of an embodiment in which only a small part of the surface of the inner area is covered with such a filling.

FIG. 5 shows three different views of a preferred shape of the shaped catalyst body of the invention. It contains two convexly shaped covers and three concavely shaped fillings at the notches at the lateral surface between each of the adjacent lobes. FIG. 5 a) shows an oblique view of the lying catalyst body, FIG. 5 b) a slightly oblique view of the upright catalyst body and FIG. 5 c) a more or less upright view to a cover.

The shaped catalyst body of the invention combines various very advantageous physical properties in one and the same shaped body and therefore clearly differs from known shaped bodies. The essential physical properties are as follows:

A high mechanical stability.
Due to its trilobed shape and despite the three essentially circular holes, the shaped catalyst body of the invention has a very high mechanical stability, particularly in comparison with rings of the same material. The symmetrically placed lobes with their combined walls in the central region significantly strengthen the mechanical stability. This is expressed by a high side crush strength and leads to the formation of significantly fewer fragments during the handling of the catalyst and during its filling into the reactor, particularly in comparison with rings of the same material. Since a large portion of the surface is protected, either as surface of the three essentially circular holes or as surface of the three notches at the outer surface at the contact areas of two adjacent lobes, and furthermore also sharp angles are generally avoided due to the outwardly curved arches, the shaped catalyst body of the invention is also characterized by a low abrasion, particularly in comparison with rings of the same material, but also in comparison with trilobes of the same material having flat cover sides. However, the mechanical stability of the shaped catalyst body of the invention is roughly comparable with trilobes of the state of the art having flat cover sides.

The mechanical stability of the shaped catalyst body of the invention can be further increased by a partly filling of the notches at the lateral surface between two adjacent lobes.

A low ratio of the body volume to the surface area.
A low ratio of the body volume to the surface area, which is also expressed as characteristic length, means that the shaped catalyst body has a large surface area compared with its body volume. The surface area is the contact area between the reaction fluid and the catalyst. The larger the surface area is, the higher the transfer of the educts from the reaction fluid into the catalyst body and of the products back to the reaction fluid. Due to its geometry, the shaped catalyst body of the invention has a low ratio of the body volume to the surface area. The outwardly curved arches at the two covers even lowers the mentioned ratio compared with trilobes of the state of the art of similar size having flat cover sides. As consequence, the shaped catalyst body of the invention is slightly advantageous over the above-mentioned trilobes of the state of the art.

A partly filling of the notches at the lateral surface between two adjacent lobes only slightly increases the ratio of the body volume to the surface area which at the end is not detrimental.

A high efficiency of the diffusion paths.
Beside a large accessible surface area, it is also important that the majority of the catalytically active mass is easily accessible and that as little mass as possible is only hard to reach. The hardly accessible mass has the disadvantage that it binds catalytically active mass and increases the weight of the shaped catalyst body without considerably contributing to the reaction. Due to the specific geometry, the shaped catalyst body of the invention shows nearly everywhere at its horizontal cross section the same or nearly the same wall thicknesses $d_2$ and $d_3$ and is therefore easily accessible. Only small areas at the three notches at the outer surface at the contact areas of two adjacent lobes and the area around the center of the trilobe are slightly less accessible. Regarding this point, the shaped catalyst body of the invention is roughly comparable with that of trilobes of the state of the art of similar size having flat cover sides.

A partly filling of the notches at the lateral surface between two adjacent lobes has only a slight effect on the efficiency of the diffusion paths at which a very small amount of the active mass around the triangle area between two holes of two adjacent lobes and the notches at the outer surface at the contact areas of the two adjacent lobes is slightly less accessible.

A high efficiency of the heat exchange.
Particularly for highly exothermic reactions, a high efficiency of the heat exchange is very important. It is achieved by the interaction of a high surface area in relation to the body volume, with highly efficient diffusion paths. These two criteria enable a fast removal of the reaction heat out of the shaped catalyst body in order to be taken away by the reaction fluid. Due to a slightly advantageous ratio of the body volume to the surface area of the shaped catalyst body of the invention, it also shows a slight advantage in the efficiency of the heat exchange over trilobes of the state of the art of similar size having flat cover sides.

A high packing density.
Furthermore, the shaped catalyst body of the invention is characterized by a high packing density. A high packing density enables the provision of a high amount of catalytically active mass per reactor volume and consequently enables the use of a smaller reactor. However, the packing density of the shaped catalyst body of the invention is significantly less than that of comparable rings, but such rings show a tremendous pressure drop as illustrated below. Compared with trilobes of the state of the art of similar size having flat cover sides, the shaped catalyst body of the invention shows a significantly higher packing density due to the outwardly curved arches at the two covers. This is a great advantage.

A low pressure drop.
Compared with the high packing density of the shaped catalyst body of the invention, it surprisingly has a low pressure drop over the reactor cross section during the gas-phase reaction. This is due to its specific geometry. The trilobed structure with the three essentially circular holes enables a good flow of the reaction fluid through the catalyst bed. The pressure drop of a filling of the shaped catalyst bodies of the invention is considerably lower by a factor of up to three than that of a filling of rings with common size. However, compared with trilobes of the state of the art of similar size having flat cover sides, the pressure drop of the shaped catalyst bodies of the invention is measurably higher, but only in a range which does not adversely affect the operation of the reactor.

As described above, single properties of the above listing might be a bit more advantageous for other shaped bodies, but then other properties of such other shaped bodies might be less advantageous or even worse. The crucial and yet surprising advantage of the shaped catalyst body of the invention are their entirely positive properties in an overall view. Compared with rings of usual size, for example, the shaped catalyst bodies of the invention are mechanically much more stable and show a significantly lower pressure drop over the reactor cross section during the gas-phase reaction. Compared with trilobes of the state of the art of similar size having flat cover sides, the shaped catalyst bodies of the invention have a higher mechanical stability, a slightly lower ratio of the body volume to the surface area, and enable a noteworthy higher packing density per reactor volume. These advantages are in the overall view much more important than the measurably higher pressure drop over the reactor cross section during the gas-phase reaction, which is in a non-detrimental range. Various of the above-mentioned advantages are caused by the inventive outwardly curved arches at the two cover sides.

A partly filling of the notches at the lateral surface between two adjacent lobes increases the mechanical stability and slightly facilitates the shaping process without showing noticeable disadvantages in other properties.

A further aspect of the invention is the preparation of the shaped catalyst body of the invention. It can be roughly divided into two major steps. The first step is the preparation of the precursor material of which the shape of the shaped catalyst body is to be formed and the second step is the forming to the shape of the shaped catalyst body. Depending on the nature of the shaped catalyst body, the precursor material of which the shape of the shaped catalyst body is formed can already be a precursor for the catalytically active compound, which is for example the usual case for full body catalysts, or it can only be a precursor for a carrier material, which is for example the usual case for supported catalysts, or it can be both together. In case of supported catalysts, the catalytically active material is then usually impregnated or deposited otherwise on the shaped structure in a subsequent step.

In one preferred embodiment of the invention, the shaped catalyst body of the invention is prepared by a process comprising
 (a) the preparation of a powdery or granular precursor material containing at least one element from group 3 to 12 of the Periodic Table of the Elements, and
 (b) its compaction to the shaped catalyst body.

Such a process mainly refers to the preparation of full body catalysts.

The preparation of the precursor material in step (a) can usually be performed in the same manner as the preparation of precursor materials described in the state of the art for the preparation of rings or trilobes and the like. This does also apply for the composition of the precursor material. As for catalysts of the state of the art, the composition of the precursor material depends on the intended use of the catalyst. Beside elements from group 3 to 12 of the Periodic Table of the Elements, the precursor mass may additionally contain further elements. Such further elements are inter alia part of the catalytically active mass such as phosphorus for VPO-catalysts or catalytically active promotors such as bismuth in some VPO-catalysts, can be part of a carrier material such as $Al_2O_3$ or $SiO_2$, are part of pore formers such as cellulose or stearic acid, or can be part of any auxiliaries for different purposes as, for example, ancillary materials for the shaping process such as graphite powder or ancillary materials for the increase of the mechanical stability of the shaped catalyst body. The preparation of the precursor material includes the mixing of the respective raw materials in solid or fluid form, chemical reactions between the raw materials, process steps such as heating, cooling, filtrating, solving, drying, mechanical processing such as grinding, milling or sieving and the like, as well as any other steps. Typical preparation methods are described in the state of the art and well known by the skilled person.

In order to enable the compaction to the shaped catalyst body in step (b), the precursor material prepared in step (a) has a powdery or granular consistency. If required, the precursor material can be processed by compacting, grinding, milling or sieving and the like to obtain the intended state. Such powdery or granular material can normally easily be poured or otherwise conveyed and therefore enables an easy processing in the compaction step (b). Without limiting the scope of the process of the invention, the size of the particles of the powdery or granular precursor material is typically in the range of 0.1 µm to 2 mm.

The compaction to the shaped catalyst body in step (b) is generally performed in a tableting machine or a similar apparatus. Tableting machines are well known to the person skilled in the art. Such apparatuses are already used for the production of cylindrically or trilobal shaped catalyst bodies with openings passing therethrough. The specific feature for the production of the shaped catalyst bodies of the invention is the specific shape and design of the tableting tool.

The die in which the material is compressed shapes the lateral surface of the body. The lower and upper punch represent the specific geometric form of the two covers of the shaped catalyst body. As usual for the tableting of a given precursor material, the speed and particularly the pressure at which the precursor material is compacted, affect the mechanical properties of the compacted shaped catalyst body as, for example, its body density or its mechanical stability. As usual for tableting processes, the specific and advantageous settings of the machine can be easily determined by the person skilled in the art by performing some test runs.

Since the preparation of the shaped catalyst body of the invention does not require specific precursor materials nor specific machines as such, it is highly flexible. It only requires a pressing tool, which is adapted to the specific shape of the intended shaped catalyst body. Pressing tools of specific geometries can easily be manufactured according to processes known in the state of the art, and can also easily be replaced in tableting machines.

After its compaction, the shaped catalyst body may be directly used as a catalyst or be required to be pre-activated, depending on the nature of the precursor material. Also the pre-activation can usually be performed in the same or at least similar manner as the pre-activation of catalyst bodies with the same precursor material and a similar geometry and shape. Typically, the pre-activation methods include the heating of the shaped catalyst body under more or less defined conditions regarding the temperatures, the heating and cooling rates, or the composition of the surrounding gas phase, such as the concentration of oxygen, inert gas or water vapor. Typical pre-activation methods are described in the state of the art and well known by the skilled person.

In another preferred embodiment of the invention, the shaped catalyst body of the invention is prepared by a process comprising
(a) the preparation of a powdery or granular precursor material,
(b) its compaction to the shape of the shaped catalyst body, and
(c) the deposition of a material containing at least one element from group 3 to 12 of the Periodic Table of the Elements.

Such a process mainly refers to the preparation of supported catalysts.

Regarding steps (a) and (b), the explanations made in the preceding paragraphs regarding the preparation and compaction of a powdery or granular precursor material containing at least one element from group 3 to 12 of the Periodic Table of the Elements mainly also apply here, but with the difference that group 3 to 12 elements of the Periodic Table of the Elements are not necessarily present in the steps (a) and (b) but also not excluded. Typically, the precursor material in step (a) mainly contains precursor material for the formation of the shaped carrier, but may also contain other compounds like pore formers, lubricants or any other auxiliaries. After the compacting of step (b), the compacted body is typically tempered or calcined to convert the carrier precursor material into the desired carrier material. This conversion increases the mechanical stability of the shaped body and is generally also important for the preparation of the pores. Typical methods and process conditions known by the person skilled in the art for the preparation of carrier materials can be used.

To obtain at the end the shaped catalyst body, step (c) requires the deposition of a material containing at least one element from group 3 to 12 of the Periodic Table of the Elements to the shaped carrier body. For this, the typical methods for the preparation of supported catalysts can be used. Such methods are well known by the person skilled in the art, such as impregnation, precipitation, vapor deposition and the like. After the deposition, the shaped catalyst body may be directly used as a catalyst or be required to be pre-activated, depending on the nature of the precursor material. Also here, the typical methods for the preparation of supported catalysts can be used.

In a preferred embodiment, a vanadium and phosphorus oxide containing shaped catalyst body is prepared. Its preparation comprises
(a) reacting a pentavalent vanadium compound and a pentavalent or trivalent phosphorus compound with an organic reducing agent, isolating the obtained vanadium and phosphorus containing precursor, drying it, converting the dried mass into a powdery or granular precursor material, and
(b) compacting it to the shaped catalyst body.

Vanadium and phosphorus oxide containing catalysts, also named as VPO-catalysts, are full body catalysts and are typically used in the heterogeneously catalyzed selective gas phase oxidation of n-butene to maleic anhydride.

The preparation of such a precursor material as described in step (a) above, the principal steps of compacting and its treatment after compacting is well described in the state of the art, as for example in U.S. Pat. No. 7,060,649, US 2011/0257,413 and various other patents and applications known by the person skilled in the art. The following paragraphs summarize the typical preparation and composition of vanadium and phosphorus oxide catalysts.

The main steps of the preparation of vanadium and phosphorus oxide catalysts as preferred shaped catalyst bodies according the invention are as follows.
(a) Preparation of the powdery or granular precursor material.
  (i) Reaction of a pentavalent vanadium compound with an organic, reducing solvent in the presence of a phosphorus compound with heating. This step can optionally be carried out in the presence of a dispersed, pulverulent support material. Reaction without addition of support material is preferred.
  (ii) Isolation of the vanadium-, phosphorus-, oxygen-comprising catalyst precursor formed ("VPO precursor"), e.g. by filtration or evaporation.
  (iii) Drying of the VPO precursor and preferably initial pre-activation by heating at a temperature of from 250 to 350° C. Pulverulent support material and/or a pore former, for example stearic acid, cellulose or paraffins, can then be added to the dried and preferably heat-treated VPO precursor and the mass thoroughly mixed and optionally grinded, milled and/or sieving to obtain a powdery precursor material.
(b) Compacting
  Compacting of the obtained powdery precursor material to the shape of the shaped catalyst body of to the invention. The compacting is preferably carried out by tableting, preferably with prior mixing with a lubricant such as graphite.
(c) Pre-activation
  Pre-activation of the shaped VPO precursor by heating in an atmosphere comprising oxygen ($O_2$), hydrogen oxide ($H_2O$) and/or inert gas.

The mechanical and catalytic properties of the catalyst can be influenced by appropriate combinations of temperatures, treatment times and gas atmospheres matched to the respective catalyst system.

As pentavalent vanadium compounds, it is possible to use oxides, acids and inorganic and organic salts which comprise pentavalent vanadium, or mixtures thereof. Preference is given to using vanadium pentoxide ($V_2O_5$), ammonium metavanadate ($NH_4VO_3$) and ammonium poly-vanadate (($NH_4$)$V_6O_{16}$), in particular vanadium pentoxide ($V_2O_5$). The pentavalent vanadium compounds present as solids are used in the form of a powder, preferably in a particle size range from 50 to 500 μm.

As phosphorus compounds, it is possible to use phosphorus compounds having a reducing action, for example phosphorous acid, and also pentavalent phosphorus compounds, for example phosphorus pentoxide ($P_2O_5$), orthophosphoric acid ($H_3PO_4$), pyrophosphoric acid ($H_4P_2O_7$), polyphosphoric acids of the general formula $H_{n+2}P_nO_{3n+1}$ where n≥3 or mixtures thereof preference is given to using pentavalent phosphorus compounds. The content of the compounds and mixtures mentioned is usually reported in wt.-% based on $H_3PO_4$. Preference is given to using from 80 to 110% strength $H_3PO_4$, particularly preferably from 95 to 110% strength $H_3PO_4$ and very particularly preferably from 100 to 105% strength $H_3PO_4$.

As solvent having a reducing action, preference is given to using a primary or secondary, acyclic or cyclic, unbranched or branched, saturated alcohol having from 3 to 6 carbon atoms or a mixture thereof. Preference is given to using a primary or secondary, unbranched or branched $C_3$-$C_6$-alkanol or cyclopentanol or cyclohexanol.

Suitable alcohols which may be mentioned are n-propanol (1-propanol), isopropanol (2-propanol), n-butanol (1-butanol), sec-butanol (2-butanol), isobutanol (2-methyl-1-propanol), 1-pentanol, 2-pentanol, 3-pentanol, 2-methyl-1-butanol, 3-methyl-1-butanol, 3-methyl-2-butanol, 2,2-dimethyl-1-propanol, 1-hexanol, 2-hexanol, 3-hexanol, 2-methyl-1-hexanol, 3-methyl-1-pentanol, 4-methyl-1-pentanol, 3-methyl-2-pentanol, 4-methyl-2-pentanol, 2,2-dimethyl-1-butanol, 2,3-dimethyl-1-butanol, 3,3-dimethyl-1-butanol, 3,3-dimethyl-2-butanol, cyclopentanol, cyclohexanol and mixtures thereof. Very particular preference is given to n-propanol (1-propanol), n-butanol (1-butanol), isobutanol (2-methyl-1-propanol), 1-pentanol, 2-methyl-1-butanol, 3-methyl-1-butanol and cyclohexanol, in particular isobutanol.

The components can be combined in various ways, for example in a stirred vessel. The amount of the solvent having a reducing action should be above the amount which is stoichiometrically required for reduction of the vanadium from the oxidation state +5 to an oxidation state in the range from +3.5 to +4.5. In general, the amount of solvent having a reduction action to be added is at least such an amount that it is sufficient for slurrying the pentavalent vanadium compound so as to make intensive mixing with the phosphorus compound added possible.

The slurry is heated to convert the abovementioned compounds and form the catalyst precursor. The temperature range to be selected is dependent on various factors, in particular the reducing action and the boiling point of the components. In general, a temperature of from 50 to 200° C., preferably from 100 to 200° C., is set. The reaction at elevated temperature generally takes a number of hours.

Promoter compounds can be added at any point in time. Suitable promoter compounds are, for example, the acetates, acetylacetonates, oxalates, oxides or alkoxides of the abovementioned promoter metals, for instance cobalt acetate, cobalt(II) acetylacetonate, cobalt(II) chloride, molybdenum (VI) oxide, molybdenum(III) chloride, iron(III) acetylacetonate, iron(III) chloride, zinc(II) oxide, zinc(II) acetylacetonate, lithium chloride, lithium oxide, bismuth(III) chloride, bismuth(III) ethyl hexanoate, nickel(II) ethyl hexanoate, nickel(II) oxalate, zirconyl chloride, zirconium(IV) butoxide, silicon(IV) ethoxide, niobium(V) chloride and niobium (V) oxide.

After the abovementioned heat treatment is complete, the catalyst precursor formed is isolated, with a cooling phase and a storage or aging phase for the cooled reaction mixture optionally being able to be inserted before isolation. In the isolation step, the solid catalyst precursor is separated off from the liquid phase. Suitable methods are, for example, filtration, decantation or centrifugation. The catalyst precursor is preferably isolated by filtration.

The isolated catalyst precursor can be processed further with or without prior washing. The isolated catalyst precursor is preferably washed with a suitable solvent in order, for example, to remove residual agent having a reducing action (e.g. alcohol) or degradation products thereof which still adhere(s) to the catalyst precursor. Suitable solvents are, for example, alcohols (e.g. methanol, ethanol, 1-propanol, 2-propanol), aliphatic and/or aromatic hydrocarbons (e.g. pentane, hexane, petroleum spirit, benzene, toluene, xylenes), ketones (e.g. acetone, 2-butanone, 3-pentanone), ethers (e.g. 1,2-dimethoxyethane, tetrahydrofuran, 1,4-dioxane) or mixtures thereof. If the catalyst precursor is washed, preference is given to using 2-propanone and/or methanol and particularly preferably methanol.

After isolation of the catalyst precursor or after washing, the solid is generally dried. Drying can be carried out under various conditions. In general, it is carried out under reduced pressure or atmospheric pressure. The drying temperature is generally from 30 to 300° C. Drying is preferably carried out at a pressure of from 1 to 30 kPa abs and a temperature of from 50 to 200° C. in an oxygen-comprising or oxygen-free gas atmosphere, for example air or nitrogen.

In a preferred embodiment, the catalyst precursor powder is intensively mixed with from about 2 to 4 wt.-% of graphite and pre-densified. The pre-densified particles can be mixed again with 1 to 2 wt.-% of graphite and are then tableted to give the shaped catalyst body.

In a further embodiment of the compacting operation, the catalyst precursor powder is intensively mixed with from about 2 to 4 wt.-% of graphite and additionally with from 5 to 40 wt.-%, in particular from 20 to 25 wt.-%, of a pore former and further treated and compacted as described above to give the shaped catalyst body. As typical pore formers, stearic acid, cellulose or paraffins are mentioned.

The precursor powder is then compacted of the shape of the shaped catalyst body. Advantageously, it is pressed in a tableting machine or a similar apparatus.

The shaped VPO precursor is pre-activated (calcined) by heating in an atmosphere comprising oxygen ($O_2$), hydrogen oxide ($H_2O$) and/or inert gas at a temperature range from 250 to 600° C. Suitable inert gases are, for example, nitrogen, carbon dioxide and noble gases. The thermal treatment can be carried out batchwise, for example in a shaft furnace, tray furnace, muffle furnace or oven, or continuously, for example in a rotary tube furnace, belt calcination furnace or rotary bulb furnace. It can comprise successive different sections in respect of the temperature, e.g. heating, holding of a constant temperature or cooling, and successive different sections in respect of the atmospheres, for example oxygen-comprising, water vapor comprising, oxygen-free gas atmospheres. Suitable pre-activation processes are described, for example, in the U.S. Pat. Nos. 5,137,860, 4,933,312 or WO 95/029,006. Particular preference is given to continuous calcination in a belt calcination furnace having at least two, for example from two to ten calcination zones which optionally have a different gas atmosphere and a different temperature. The mechanical and catalytic properties of the catalyst can be influenced and thus set in a targeted way by a suitable combination of temperatures, treatment times and gas atmospheres matched to the respective catalyst system.

Preference is given to a calcination in which the catalyst precursor is (i) heated to a temperature of from 200 to 350° C. in an oxidizing atmosphere having an oxygen content of from 2 to 21 vol.-% in at least one calcination zone and maintained under these conditions until the desired average oxidation state of the vanadium has been attained; and (ii) heated to a temperature of from 300 to 500° C. in a nonoxidizing atmosphere having an oxygen content of ≤1 vol.-% and a hydrogen oxide content of from 20 to 75 vol.-% in at least one further calcination zone and maintained under these conditions for ≥0.5 hour.

In general, the calcination comprises a further step (iii) which is to be carried out after step (ii) and in which the calcined catalyst precursor is cooled in an inert gas atmosphere to a temperature of ≤300° C., preferably from ≤200° C. and particularly preferably ≤150° C.

In the calcination according to the process of the invention, further steps are possible before, between and/or after steps (i) and (ii) or (i), (ii) and (iii). Without constituting a limitation, further steps which may be mentioned are, for example, changes in the temperature (heating, cooling), changes in the gas atmosphere (setting of a different gas atmosphere), further hold times, transfer of the catalyst intermediate into other apparatuses or interruption of the overall calcination operation.

For their use in the heterogeneously catalyzed selective gas phase oxidation of n-butene to maleic anhydride, the shaped catalyst bodies of the VPO-catalysts are preferably characterized by a V content of 25 to 40 wt.-%, a P content of 15 bis 25 wt.-%, a Mo content of 0 bis 2 wt.-%, a Fe content of 0 bis 2 wt.-%, and a geometry of the shaped catalyst body in which $d_1$=5 to 2.5 mm,
$d_2$=0.8 to 1.6 mm,
$d_3$=0.8 to 1.6 mm,
$h_1$=4 to 9 mm,
$h_2$, $h_3$=0.2 to 3 mm,
and outwardly shaped arches.

In another preferred embodiment, a Mo, Fe and Bi multi-metal oxide containing shaped catalyst body is prepared. Its preparation comprises (a) preparing an aqueous mixture containing a Mo compound, a Fe compound and a Bi compound, drying it, converting the dried mass into a powdery or granular precursor material, and
(b) compacting it to the shaped catalyst body.

Mo, Fe and Bi multi-metal oxide containing catalysts are full body catalysts and are suitable for the heterogeneously catalyzed partial gas phase oxidation of propene to acrolein, of isobutene to methacrolein, of propene to acrylonitrile and of isobutene to methacrylonitrile. They are particularly suitable for the heterogeneously catalyzed partial gas phase oxidation of propene to acrolein.

The preparation of such a precursor material as described in step (a) above, the principal steps of compacting and its treatment after compacting is well described in the state of the art, as for example in US 2013/0,023,699 and various other patents and applications known by the person skilled in the art. The following paragraphs summarize the typical preparation and composition of Mo, Fe and Bi multi-metal oxide containing catalysts.

(a) Preparation of the powdery or granular precursor material.
  (i) Preparation of an aqueous mixture containing a Mo compound, a Fe compound, a Bi compound and optionally one or more promotor compounds.
  (ii) Drying of the obtained mixture, e.g. by spray drying or by conventional evaporation.
  (iii) The dried mixture may optionally be further processed before its compacting into the desired shape, e.g. by comminuting to a desired fineness, by pre-calcining or by pre-compacting.
  Instead of steps (i) and (ii), it is in principal also possible to mix the precursor material in dry form.
(b) Compacting
  Compacting of the obtained powdery precursor material to the shape of the shaped catalyst body of to the invention. The compacting is preferably carried out by tableting, preferably with prior mixing with a lubricant such as graphite.
(c) Thermal treatment
  Thermal treatment of the shaped Mo, Fe and Bi containing precursor by heating in an inert, oxidizing or reducing atmosphere.

The mechanical and catalytic properties of the catalyst can be influenced by appropriate combinations of temperatures, treatment times and gas atmospheres matched to the respective catalyst system.

As an advantageous Mo source for the preparation of the precursor mixture ammonium heptamolybdate tetrahydrate is mentioned. Further possible Mo sources are for example ammonium orthomolybdate (($NH_4$)$_2MoO_4$), ammonium dimolybdate (($NH_4$)$_2Mo_2O_7$), ammonium tetramolybdate dihydrate (($NH_4$)$_2Mo_4O_{13}$×5 $H_2O$) and ammonium decamolybdate dihydrate (($NH_4$)$_4Mo_{10}O_{32}$×2 $H_2O$).

Advantageous Fe sources are salts of $Fe^{3+}$ such as iron (III) nitrate hydrates, in particular iron(III) nitrate nonahydrate. Of course, it is also possible to use salts of $Fe^{2+}$ as Fe source.

As Bi sources salts of $Bi^{3+}$ are advantageously applied. Possible salts of this type are, for example, bismuth(III) oxide, bismuth(III) oxide nitrate (bismuth subnitrate), bismuth(II) halide (e.g. fluoride, chloride, bromide, iodide) and in particular bismuth(III) nitrate pentahydrate.

Regarding optional promotor compounds, also these compounds are preferably added in form of their suitable salts as described in the state of the art. Possible promotor compounds are for instance Ni, Co, Cu, alkali metals, alkaline earth metals, Th, Sm, Zn, Cd, P, As, B, Sb, Sn, Pb, Ce, V, Cr, Nb, Ta, Re, Rh, W, Ag, Au, Ga, Si, Al, Ti and Zr are mentioned.

The precursor compounds are preferably mixed together in the form of their aqueous solutions and dried to obtain a solid material which can be further processed. As already mentioned, spray drying or conventional evaporation are possible methods.

In case of spray drying, typical gas inlet temperatures are in the range from 250 to 450° C. and preferably 270 to 370° C. Typical gas outlet temperatures are in the range from 100 to 160° C. and preferably 120 to 150 C. The average particle diameter of the resulting spray powder is typically 10 to 100 μm, preferably 15 to 60 μm and more preferably 25 to 50 μm, whereas the mentioned diameter is determined to ISO 13320 by means of light scattering on spray powder dispersed in water at 25° C. The tapped bulk density (25° C., 0.1 MPa abs) of the spray powder is typically 500 to 1300 g/L and preferably 700 to 1100 g/L. The ignition loss of the spray powder (calcined at 600° C. powder temperature under stationary air (present in excess) for 3 hours is typically 20% to 40% by weight, preferably 25% to 35% by weight, based on its starting weight.

Before the compacting of the dried precursor material into the desired shape, it can be further processed, e.g. by comminuting, pre-calcining or pre-compacting. Furthermore, also auxiliaries such as graphite or stearic acid as lubricants and other adjuvants can be added. Appropriately for application purposes, the particle diameters of the precursor composition to be compacted (of the finely divided intimate dry mixture), optionally as a result of prior coarsening by compaction, are in the range of 100 to 2000 μm, preferably 150 to 1500 μm, more preferably 400 to 1250 μm, or 400 to 1000 μm, or 400 to 800 μm.

The precursor powder is then compacted in the shape of the shaped catalyst body. Advantageously, it is pressed in a tableting machine or a similar apparatus. Advantageously, the shaping pressures employed in a compaction of the finely divided precursor composition as finely divided intimate dry mixture are 50 kg/cm$^2$ to 50000 kg/cm$^2$, preferably 200 to 10000 kg/cm$^2$, more preferably 400 to 5000 kg/cm$^2$ and most preferably 600 to 3000 kg/cm$^2$. The shaped catalyst precursor bodies have commonly a body density of 1 to 5 g/cm$^3$, preferably 1.5 to 3.5 g/cm$^3$, and most preferably 2 to 3 g/cm$^3$.

The shaped Mo, Fe and Bi containing precursor is pre-activated (calcined) by heating in an inert, oxidizing or reducing atmosphere, and preferably in an oxidizing atmosphere comprising oxygen ($O_2$) such as in air, at a temperature range from 350 to 650° C. The thermal treatment can principally be carried out in various types of furnace, e.g. heatable convection chambers (convection furnaces, e.g. convection shaft furnaces), tray furnaces, rotary tube furnaces, belt calciners or shaft furnaces. The shaped catalyst bodies have commonly a body density of 1 to 5 g/cm³, preferably 1.2 to 2.5 g/cm³ and most preferably 1.4 to 2.2 g/cm³.

In an alternative but also preferred embodiment, a Mo, Fe and Bi multi-metal oxide containing shaped catalyst body is prepared as a coated catalyst. For this, a mixture containing a Mo compound, a Fe compound and a Bi compound is coated on a prefabricated shaped support body which predetermines the shape of the final, Mo, Fe and Bi containing shaped catalyst body. The shaped support body may contain a carrier material such as $Al_2O_3$, $SiO_2$ and the like which is typically used for shaped support bodies. The shaped support body can be produced as known in the state of the art but with the specific that it is shaped in the shape of the shaped catalyst body. Its coating with the Mo. Fe and Bi multi-metal oxide containing precursor mixture can also be performed as generally known in the state of the art, e.g. by using a rotatable container. At the end, the coated shaped catalyst body is usually pre-activated (thermally treated) as described above for the full body catalyst.

For their use in the heterogeneously catalyzed selective gas phase oxidation of propene to acrolein or acrylonitrile, of isobutene to methacrolein or methacrylonitrile, the shaped catalyst bodies of the Mo, Fe and Bi multi-metal oxide containing catalysts are preferably characterized by a stoichiometry of the general formula (I)

$$Mo_{12}Bi_aFe_b \times 1_c \times 2_d \times 3_e \times 4_f O_n \quad (I)$$

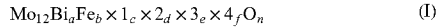

where
X1=Ni and/or Co,
X2=TI, Sm, an alkali metal and/or an alkaline earth metal,
X3=Zn, P, As, B, Sb, Sn, Ce, Pb, V, Cr, Nb and/or W,
X4=Si, Al, Ti and/or Zr,
a=0.2 to 5,
b=0.01 to 5,
c=0 to 10,
d=0 to 2,
e=0 to 8,
f=0 to 10, and
n=a number which is determined by the valence and abundance of the elements in formula (I) other than oxygen,
or by a stoichiometry of the general formula (II)

$$[Y1_{a'} \; Y2_{b'} \; O_{x'}]_p [Y3_{c'} \; Y4_{d'} \; Y5_{e'} \; Y6_{f'} \; Y7_{g'} \; Y8_{h'} \; O_{y'}]_q \quad (II)$$

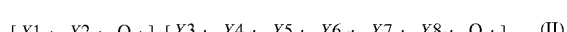

where
Y1=Bi alone, or Bi and at least one of the elements Te, Sb, Sn and Cu,
Y2=Mo and/or W,
Y3=an alkali metal, TI and/or Sm,
Y4=an alkaline earth metal, Ni, Co, Cu, Mg, Zn, Sn and/or Ca
Y5=Fe alone, or Fe and at least one of the elements V, Cr and Ce,
Y6=P, As, B and/or Sb,
Y7=a rare earth metal, Ti, Zr, Nb, Ta, Re, Ru, Rh, Ag, Au, Al, Ga, In, Si, Ge and/or Pb,
Y8=Mo alone, or Mo and W,
a'=0.01 to 8,
b'=0.1 to 30,
c'=0 to 4,
d'=0 to 20,
e'=>0 to 20,
f=0 to 6,
g'=0 to 15,
h'=8 to 16,
x', y'=numbers which are determined by the valence and abundance of the elements in formula (II) other than oxygen, and
p, q=numbers whose p/q ratio is from 0.1 to 10,
having a Mo content of 10 to 85 wt.-%
and a geometry of the shaped catalyst body in which
$d_1$=1 to 5 mm, more preferably 1 to 3 mm and particularly preferably 1 to 2 mm,
$d_2$=1 to 2 mm,
$d_3$=1 to 2 mm,
$h_1$=4 to 9 mm,
$h_2$, $h_3$=0.2 to 1 mm,
and outwardly shaped arches.

The shaped catalyst body of the invention can easily be prepared by known methods. Only the compaction requires specific dies and pressing punches or adequate alternatives for the shaping of the outwardly curved arches. However, the manufacture of specific pressing punches or adequate alternatives is part of the expert skills and hence within the usual practice.

The shaped catalyst body of the invention can advantageously be used in the catalytic conversion of organic compounds in the gas-phase in fixed-bed reactors. The geometry of such a fixed-bed reactor, including its length and its inner diameter, as well as the existence of specific internals such as thermocouples can be adapted to the specific requirements of the reaction and the catalytic performance. Moreover, also the manner and nature of the filling of the fixed-bed reactor can be adapted to the specific requirements of the reaction and the catalytic performance. For example, the reactor may contain a continuous filling of one type of the shaped catalyst body, it may contain a mixture of different shaped catalyst bodies, whereas also catalyst bodies other than the inventive ones may be present, it may also contain a structured filling of different shaped catalyst bodies, whereas also catalyst bodies other than the inventive ones may be present, and it may also contain inerts as diluents.

Although the shaped catalyst body of the invention can be broadly used in various catalytic conversion of various organic compounds in the gas-phase in fixed-bed reactors, it is preferably used in catalytic conversions in the presence of oxygen such as oxidations or oxychlorinations. Since oxidation reactions are generally exothermic, the heat generated during the oxidation must be removed. For poorly exothermic reactions, it may be possible to remove the heat together with the gaseous effluent stream. For other exothermic reactions, and particularly for highly exothermic reactions, a cooling of the fixed-bed reactor may be required. Such a cooling can, for example, be performed by cooled trays inside the reactor, or by a cooled outer wall of the reactor. The last-mentioned type of cooling is, of course, more effective for reactors with a higher ratio of the outer surface to the inner volume, and thus have a tubular shape. Such reactors are called fixed-bed tubular reactors and are generally more preferred for gas-phase oxidation reactions.

Therefore, a further aspect of the invention is a reactor tube filled with a plurality of shaped catalyst bodies of the invention. The inner diameter of such a reactor tube normally depends on the size of the shaped catalyst bodies filled in and the exothermicity of the oxidation reaction. Generally, the inner diameter corresponds at least to the highest value of the outer dimension of the shaped catalyst body, i.e. either the total height $h_0$ or the outer diameter $d_0$, whichever is higher. More preferably, the inner diameter of a reactor tube is ≥1.5, particularly preferably ≥2 and very particularly preferably ≥2.5 times the highest value of the outer dimension of the shaped catalyst body. The recommended maximum of the inner diameter of a reactor tube mainly depends on the ability to adequately remove the generated heat. It can be determined by the person skilled in the art in the same way as it is determined for other shaped catalysts used in such types of reactions. However, the inner diameter of such a reactor tube is preferably ≤10 cm, more preferably ≤8 cm and particularly preferably ≤5 cm. The length of such reactor tubes mainly depends on the nature of the oxidation reaction. It is normally in the range of 1 to 20 m, preferably ≥2 m, more preferably ≥3 m and preferably ≤15 m, more preferably ≤10 m.

The above-mentioned reactor tube is filled with a plurality of shaped catalyst bodies of the invention. The term plurality indicates that the reactor tube is filled with a greater number of such shaped catalyst bodies, depending on the size of the shaped catalyst bodies, the type of the filling, meaning whether solely filled with such shaped catalyst bodies or e.g. diluted with inerts or other catalyst bodies, and depending on the geometry of the reactor tube, mainly its inner diameter and length. To be more specific, plurality preferably means at least 100 or more of such shaped catalyst bodies. There is no numerous restriction for the maximum number.

Hence, a more preferred aspect of the invention is a reactor tube filled with ≥100 particles of the shaped catalyst bodies of the invention. Particularly preferably, the reactor tube has an inner diameter of ≥1.5 times the highest value of the outer dimension of the shaped catalyst body and a length of ≥1 m.

Since such a tube shows only a very restricted inner volume per unit of length, it is preferred to combine a plurality of such tubes side-by-side to a large reactor unit. Such a reactor unit is well known in the state of the art as shell-and-tube reactor, in which a cooling medium such as a salt bath circulates around the tubes. The use of such a shell-and-tube reactor is particularly preferred for the performance of gas-phase oxidations in the presence of the inventive shaped catalyst bodies. The number of the reactor tubes in a shell-and-tube reactor mainly depends on the intended production capacity of the plant. It is normally in the range of 10000 to 60000 tubes, preferably ≥20000 and preferably ≤50000 tubes.

Finally, a further aspect of the invention is a process for the production of an oxidized organic compound by an heterogeneously catalyzed gas-phase oxidation of an organic compound in the presence of an oxygen containing gas and a shaped catalyst body of the invention.

The oxidation is typically be performed with an oxygen-containing gas as oxidizing agent, such as air, synthetic air, an oxygen enriched gas or even highly concentrated or pure oxygen, as far as the heat generation allows higher oxygen concentrations.

As preferred processes of the invention, the oxidation of n-butane or benzene to maleic anhydride, the oxidation of propene to acrolein, the oxidation of isobutene to methacrolein, the oxidation of acrolein to acrylic acid, the oxidation of methacrolein to methacrylic acid, and the oxidation of methanol to formaldehyde are mentioned.

Particularly preferred is a process for the production of maleic anhydride by the heterogeneously catalyzed gas-phase oxidation of n-butane in the presence of an oxygen containing gas and a shaped catalyst body of the invention containing an oxidic material comprising vanadium and phosphorus.

Beside the above-mentioned use of n-butane as the raw material for the production of maleic anhydride, also other aliphatic or aromatic, saturated or unsaturated hydrocarbons, preferably with 4 to 6 carbon atoms, and more preferably with 4 carbon atoms, such as 1-butene, 2-butene or 1,3-butadiene can be basically used.

The particularly preferred process for the production of maleic anhydride by oxidation of n-butane in the presence of a shaped catalyst body of the invention is preferably carried out under the process conditions well described in the state of the art, as for example in U.S. Pat. No. 7,060,649, US 2011/0,257,413 and various other patents and applications known by the person skilled in the art. Typically, the process is preferably carried out at a temperature of from 250 to 500° C., preferably from 380 to 460° C. and particularly preferably from 380 to 440° C. It is advantageously carried out isothermally with a temperature profile which increases over the length of the reactor, or by using a combination of a temperature which increases over the length of the reactor and an isothermal mode of operation. It is advantageously carried out at an oxygen partial pressure of from 0.001 to 0.1 MPa abs, preferably from 0.01 to 0.1 MPa abs, particularly preferably from 0.03 to 0.1 MPa abs, in particular from 0.04 to 0.09 MPa abs. The hydrocarbon concentration of the feed stream fed to the reactor unit is from 0.5 to 10 vol.-%, preferably from 0.5 to 5 vol.-%, particularly preferably from 1 to 3 vol.-% and very particularly preferably from 1 to 2.5 vol.-%. The hydrocarbon conversion per pass through the reactor is from 40 to 100%, preferably from 50 to 95%, particularly preferably from 70 to 95% and in particular from 85 to 95%, of the hydrocarbon in the feed stream. The GHSV (gas hourly space velocity) of preferably from 1000 to 5000 $h^{-1}$ and particularly preferably from 1000 to 3000 $h^{-1}$, based on the volume of the feed stream standardized to 0° C. and 0.1013 MPa abs and based on the reaction volume which is filled with catalyst, is preferably set via the amount of feed stream introduced into the reactor unit. Preferably, a volatile phosphorus compound is advantageously introduced into the gas in the process of the invention to ensure a long catalyst operating life and a further increase in the conversion, selectivity, yield, space velocity of the catalyst and space-time yield. Its concentration at the beginning, i.e. at the reactor inlet, is from 0.2 to 20 vol.-ppm of the volatile phosphorus compound based on the total volume of the gas at the reactor inlet. Preference is given to a content of from 0.5 to 5 vol.-%. Volatile phosphorus compounds are all phosphorus-comprising compounds which are present in gaseous form in the desired concentration under the use conditions. Preference is given to using triethyl phosphate or trimethyl phosphate as volatile phosphorus compound.

Furthermore, a process for the production of acrolein, acrylic acid, acrylonitrile, methacrolein or methacrylonitrile by the heterogeneously catalyzed gas-phase oxidation of propene or isobutene in the presence of an oxygen containing gas and a shaped catalyst body of the invention containing an oxidic material comprising Mo, Fe and Bi is also particularly preferred. In case acrolein or acrylonitrile is prepared as oxidized organic compound, propene is used as organic compound, and in case methacrolein or methacrylonitrile is prepared as oxidized organic compound, isobutene is used as organic compound.

The particularly preferred process for the production of acrolein, acrylonitrile, methacrolein or methacrylonitrile by oxidation of propene or isobutene in the presence of a shaped catalyst body of the invention is preferably carried out under the process conditions well described in the state of the art, as for example in US 2005/0,101,803 and various other patents and applications known by the person skilled in the art.

Typically, a salt bath cooled shell-and-tube reactor is used. The inner diameter of each reactor tube is typically from 20 to 30 mm, preferably from 21 to 28 mm and most preferably from 25 to 27 mm. The length of each reactor tube is typically 2 to 5 m, preferably 3 to 4.5 m and most preferably 3.2 to 4 m. Typically, the process is preferably carried out at a temperature of from 300 to 450° C. and a reaction pressure of 0.05 to 0.4 MPa abs. The hydrocarbon concentration of the feed stream fed to the reactor unit is typically from 4 to 20 vol.-%, preferably from 5 to 15 vol.-% and particularly preferably from 5 to 8 vol.-%. The hydrocarbon conversion per pass through the reactor is from 50 to 100%, preferably from 80 to 99% and particularly preferably from 90 to 99% of the hydrocarbon in the feed stream. The GHSV (gas hourly space velocity) is preferably from 1000 to 10000 h$^{-1}$ and particularly preferably from 1500 to 5000 h$^{-1}$, based on the volume of the feed stream standardized to 0° C. and 0.1013 MPa abs and based on the reaction volume which is filled with catalyst.

Due to its inventive geometry, the shaped catalyst body of the invention combines a high mechanical stability, a high packing density per reactor volume, a high efficiency of the diffusion paths inside the body volume, a high packing density in a typical reactor tube, and a high efficiency of the heat exchange of the shaped catalyst body with a low ratio of the body volume to the surface area, a low pressure drop over the reactor cross section during the gas-phase reaction, a low formation of fragments during the handling of the catalyst and its filling into the reactor, and a low abrasion. Compared with known shapes described in the state of the art, its properties are entirely positive in an overall view. It is very flexible regarding its active mass, so that the same precursor oxidic materials as for known shaped catalysts used in the conversion of organic compounds such as oxidations, oxychlorinations, hydrogenations and other conversions can be used.

Furthermore, the shaped catalyst body of the invention can easily be prepared by methods known by the person skilled in the art. Although specific pressing punches or adequate alternatives are required for shaping, their manufacture is part of the expert skills and easy to perform.

The shaped catalyst body of the invention enables the production of various classes of organic compounds by an heterogeneously catalyzed gas-phase conversion of the respective organic educt compounds, including the production of oxidized organic compounds, such as acrolein or acrylic acid from propene, or maleic anhydride from n-butane, with a high yield and a high selectivity by utilizing the specific advantages of the shaped catalyst body.

EXAMPLES

Since the advantageous features of the inventive shape of the shaped catalyst bodies regarding their physical properties such as their surface area to body volume ratio, their mechanical stability, their packing density in a typical reactor tube, their total surface area per packing volume in a typical reactor tube and their pressure drop in a typical reactor tube can better and easier be compared with the respective features of typical shaped catalyst bodies of the state of the art by numerical simulations than by laborious experiments, numerical simulations have been made. The general procedure of the numerical simulations is explained in the following.

Simulation Procedure

Starting point for examples 1 to 5 was the simulation of a 6.5×5.0×3.5 ring of the state of the art with an outer diameter of 6.5 mm, an inner hole with a diameter of 3.5 mm and a height of 5.0 mm, which is a typical dimension of a vanadyl pyrophosphate $(VO)_2P_2O_7$ catalysts (VPO catalyst) used in the oxidation of n-butane to maleic anhydride. Such a shaped catalyst body was created by CAD (Computer Aided Design) as a comparative shaped body. Based on the mentioned ring, inventive and other comparative shaped catalyst bodies have been created by CAD and compared with each other.

For examples 6 to 10, the starting point was a simulation of another ring of the state of the art with a 5.0×5.0×2.0 dimension which relate to an outer diameter of 5.0 mm, an inner hole with a diameter of 2.0 mm and a height of 5.0 mm. Such dimension is typical for a Mo, Fe and Bi multimetal oxide catalyst used in the oxidation of propene to acrolein and acrylic acid.

Although the dimensions $d_0$, $d_1$, $d_2$, $d_3$, $h_0$, $h_1$, $h_2$, and $h_3$ are defined for the shaped catalyst body of the invention, they are also used in an analogous manner for the comparative shaped catalyst bodies as follows:

$d_0$ Outer diameter as the diameter of the smallest circle, which just encircles the shaped catalyst body over the horizontal cross section. In case of a ring as shaped catalyst body, $d_0$ refers to the outer diameter of the ring.

$d_1$ Inner diameter of the continuous hole or holes.

$d_2$ Wall thickness between two continuous holes. Since there is only one hole in a ring, there is no $d_2$ in rings.

$d_3$ Wall thickness between a continuous hole and the lateral surface. In case of a ring as shaped catalyst body, $d_3$ is the wall thickness around the single hole.

$h_0$ Total height in the vertical direction.

$h_1$ Height between the (imaginary) plane bottom cover area and the (imaginary) plane top cover. In case of a shaped catalyst body with two plane covers, $h_1$ is equal to $d_0$.

$h_2$, $h_3$ Height of the outwardly curved arches. In case of plane covers, $h_2$ and $h_3$ are 0.

Besides the geometry, two further physical properties had to be defined for comparison reasons. One of these two physical properties is the body density of the shaped catalyst body. For simplification purpose, it was set for all examples to 1 g/cm$^3$, which is equal to 1000 kg/m$^3$. Although this value deviates from the typical body densities of VPO and other metal oxides, such as Mo, Fe and Bi multi-metal oxides, which are higher, it does not impair the direct comparison between the different inventive and comparative shaped catalyst bodies. The other physical property is the mechanical hardness of the bulk material. Also here, a fixed value was picked out and used for all simulations. The mechanical hardness determines, together with the shape and the absolute dimensions, the side crush strength of the respective shaped catalyst body. As for the properties which are derived from the body density, also the properties which are derived from the mechanical hardness can directly be compared since the same initial value was used in all simulations.

Based on the geometry, the body density and the mechanical hardness, a specific geometric value which is called "characteristic length", the side crush strength, the packing density in a model reactor tube and the pressure drop in a model reactor tube at a certain flow rate was calculated by simulation. The mentioned values are described in the following.

Characteristic Length

The characteristic length is defined as the ratio between the body volume, which is expressed as "V" and measured in $mm^3$, and the surface area, which is expressed as "SA" and measured in $mm^2$. It is expressed in mm. The body volume and the surface area can easily be calculated from the geometry of the shaped catalyst body. At a given body volume, the characteristic length decreases by an increasing surface area. Since a large surface area is advantageous for the mass transfer of the educt compounds of the reaction mixture into the shaped catalyst body and of the product compounds back to the reaction mixture, a low characteristic length is desirable for an efficient catalysis.

Side Crush Strength

The side crush strength, which is expressed as "SCS", indicates the mechanical strength of a shaped catalyst body. In practice, it is measured by diametrically compressing a ring shaped, cylindrical shaped or trilobe shaped catalyst body in parallel to the axis by two even plates and determining the force at which the shaped catalyst body crushes. The side crush strength is expressed in N. For the present numerical simulation, a numerical method was used to simulate the side crush strength test under the consideration of the shape of the shaped catalyst body, its absolute dimensions and the mechanical hardness of the bulk material. A high side crush strength is generally advantageous since it is an indication for a high mechanical stability of the shaped catalyst body. Nevertheless, the side crush strength of a shaped catalyst body has to be seen in relation to its mass, or, if the body density is the same, in relation to its body volume. The higher the mass of a shaped catalyst body, the higher shall the side crush strength be in order to avoid a cracking during the filling of the reactor tubes. In other words, a big shaped catalyst body with a specific side crush strength is mechanically weaker than a small shaped catalyst body with the same side crush strength. Therefore, the more meaningful value is the side crush strength SCS per body volume V, measured in $N/mm^3$.

Packing Density

The packing density indicates how dense the shaped catalyst bodies are located in a vertical reactor tube if they are slackly filled in from the top of the tube. For the present numerical simulations, an inner diameter ID of the reaction tube of 21 mm for examples 1 to 5 and of 26 mm for examples 6 to 10 was taken since these are typical values for shell-and-tube reactors, e.g. regarding the 21 mm for the oxidation of n-butane to maleic anhydride or the 26 mm for the oxidation of propene to acrolein. The arrangement of the shaped catalyst bodies in the reactor tube during their filling was calculated by using Newton's equations of motion and the spatial geometry of the filled tube was visualized by CAD. The packing density is expressed in $kg/m^3$. A high packing density of the shaped catalyst bodies is generally preferred, since it relates to a high amount of catalytically active material per volume reaction zone, which inter alia enables a more compact design of the reactor for a given conversion.

Surface Area Per Packing Volume

The surface area per packing volume indicates the available surface area of the shaped catalyst body in a vertical reactor tube if they are slackly filled in from the top of the tube. For the present numerical simulations, the same inner diameter ID of the reaction tube as for the packing density was taken, i.e. 21 mm for examples 1 to 5 and 26 mm for examples 6 to 10. The arrangement of the shaped catalyst bodies in the reactor tube during their filling was calculated by using Newton's equations of motion and the spatial geometry of the filled tube was visualized by CAD. The surface area per packing volume is expressed in $m^2/m^3$. A high surface area per packing volume is generally preferred, since it relates to a large surface area of the catalyst bodies per volume of the reaction zone.

Pressure Drop

Based on the geometric shape and the filling of the reactor tube as described under packing density above, the pressure drop in the reactor tube was calculated for a flow of 1.0 m/s of air at 20° C. and a pressure at the end of the reactor tube of 0.1 MPa abs. The flow rate was based on the empty reaction tube, so that for each example the same amount of air was passed. The numerical calculation was performed with the thermodynamic and transport properties of air specified in the recognized scientific literature. The pressure drop is expressed in Pa/m. A low pressure drop is advantageous since it enables a lower pressure of the gas at the top of the reaction tube and thus also a lower energy demand for pressing the gas through the reaction tube.

Examples 1 to 5 relate to comparative and inventive dimensions for the oxidation of n-butane to maleic anhydride, and examples 6 to 10 to comparative and inventive dimensions for the oxidation of propene to acrolein and acrylic acid.

Example 1 (Comparative)

Example 1 relates to a 6.5×5.0×3.5 ring with an outer diameter of 6.5 mm, an inner hole with a diameter of 3.5 mm and a height of 5.0 mm, which is a typical shape and dimension of a VPO catalyst. It was already mentioned above as starting point of the simulation of examples 1 to 5. The properties of such rings have been simulated as mentioned above and are summarized in FIG. 6.

This shaped catalyst body of the state of the art has a characteristic length V/SA of 0.57 mm, which is a fairly high value and which indicates that the volume V is fairly high compared with the surface area SA. The simulation of the side crush strength SCS shows a value of 22.3 N and a side crush strength per body volume SCS/V of 0.191 $N/mm^3$. A SCS/V value of <0.2 $N/mm^3$ indicates a higher crushing risk during the filling of the reaction tubes and is therefore not a preferred value. The visualized catalyst bed in a 21 mm reaction tube is shown in FIG. 7. The simulated geometrical arrangement results in a packing density of 354 $kg/m^3$, which is a good value. The surface area SA per packing volume was 616 $m^2/m^3$ which is a viable value. With this simulated catalyst bed, the pressure drop at a flow of 1.0 m/s of air at 20° C. and a pressure at the end of the reactor tube of 0.1 MPa abs was calculated. It amounts to 1080 Palm. Although this is a viable value, a pressure drop of <1000 Pa/m would be more advantageous.

Example 2 (Comparative)

Example 2 relates to a 5.5×3.0×3.0 ring with an outer diameter of 5.5 mm, an inner hole with a diameter of 3.0 mm and a height of 3.0 mm. It was derived from the 6.5×5.0×3.5 ring of example 1 by reducing the outer diameter from 6.5 mm to 5.5 mm while keeping the ratio of the outer diameter $d_0$ to the inner diameter of the hole $d_1$ constant. By this downsizing, also the total height $h_0$ was reduced from 5.0 mm to 3.0 mm, which is a common height for 5.5 mm rings. This shaped catalyst body is also state of the art due to its classical ring shape. The properties of these rings have been simulated as mentioned above and are summarized in FIG. 6.

This shaped catalyst body has a characteristic length V/SA of 0.44 mm, which is significantly lower than that of the ring of example 1 and in absolute terms an advantageous low value. It indicates that the surface area SA is fairly high compared with the volume V. The simulation of the side crush strength SCS shows a value of 12.3 N and a side crush strength per body volume SCS/V of 0.247 N/mm³. This indicates a fairly stable shaped body with a low crushing risk during the filling of the reaction tubes. The visualized catalyst bed in a 21 mm reaction tube is shown in FIG. 7. Compared with the visualized catalyst bed of the shaped body of example 1, it is much more dense. The simulated geometrical arrangement results in a packing density of 381 kg/m³, which is a good value. The surface area SA per packing volume was 865 m²/m³ which is a high value. With this simulated catalyst bed, the pressure drop at a flow of 1.0 m/s of air at 20° C. and a pressure at the end of the reactor tube of 0.1 MPa abs was calculated. It amounts to a very high value of 2174 Pa/m.

Although the characteristic length, the side crush strength per body volume and the packing density are advantageous, such a high pressure drop is technically and energetically very disadvantageous. Targeted pressure drops are at <1000 Pa/m.

Example 3 (Comparative)

Example 3 relates to a trilobe with three continuous holes and two flat cover sides. Due to the flat covers, this trilobe refers of the state of the art. It was designed such that the characteristic length V/SA is around 0.5 mm, which is pretty well between the characteristic lengths V/SA of the shaped catalyst bodies of examples 1 and 2. The wall thicknesses $d_2$ and $d_3$ have been set to 1.00 mm and the diameter of the inner holes $d_1$ to 2.00 mm. Both values are significantly lower than those of the rings of examples 1 and 2. This reduction was required to keep the outer diameter $d_0$ at a value which is still suitable for the filling of 21 mm tubes. With the above-mentioned values of $d_1$, $d_2$ and $d_3$, the outer diameter $d_0$ amounts to 7.5 mm. Significantly lower values of $d_2$ and $d_3$ would lead to a significantly lower mechanical stability compared with the rings of examples 1 and 2, and a significantly lower diameter of the inner holes $d_1$ would have negatively influenced the mass transfer behavior compared with that of the rings of examples 1 and 2. As a consequence, significantly lower values of $d_1$, $d_2$ and $d_3$ would have negatively influenced the comparability of the rings of examples 1 and 2 with the trilobe of this example 3. Based on the fixed values of $d_1$, $d_2$, $d_3$ and a characteristic length V/SA of about 0.5 mm, a total height $h_0$ of 9.2 mm results.

This shaped catalyst body has a characteristic length V/SA of 0.51 mm, which is pretty well between the characteristic lengths V/SA of the shaped catalyst bodies of examples 1 and 2. The simulation of the side crush strength SCS shows a high value of 57.1 N and a side crush strength per body volume SCS/V of 0.264 N/mm³. This indicates a stable shaped body with a low crushing risk during the filling of the reaction tubes. The visualized catalyst bed in a 21 mm reaction tube is shown in FIG. 7. It is notably less dense than the catalyst bed of the small rings of example 2 and also visibly less dense than the catalyst bed of the rings of example 1. Due to the relatively high total length of 9.2 mm, the visualized catalyst bed shows some areas of free space. Such areas of free space are disadvantageous since they represent unused volume in the reactor tubes. Furthermore, such areas of free space may facilitate the slip of unreacted educt to the reactor outlet. The simulated geometrical arrangement results in a packing density of only 304 kg/m³, which is a relatively low value and which underlines the unfavorable findings of the visualized catalyst bed. The surface area SA per packing volume was only 596 m²/m³ which is very low. With this simulated catalyst bed, the pressure drop at a flow of 1.0 m/s of air at 20° C. and a pressure at the end of the reactor tube of 0.1 MPa abs was calculated. It amounts to 612.1 Pa/m, which is a very low value and which is fully in line with the loosely packed catalyst bed.

Although the characteristic length, the side crush strength per body volume and the very low pressure drop are advantageous, the low packing density clearly illustrates that the total amount of catalytically active material is only low and the volume of the reactor tubes not optimally used. In practice, this would require a larger reactor with a larger reaction volume.

Example 4 (Inventive)

Example 4 relates to an inventive trilobe with three continuous holes and outwardly curved arches at the two cover sides. The objective of example 4 was to take the comparative trilobe of example 3 as basis and to implement outwardly curved arches, which are essential for the inventive shaped catalyst bodies, in order to demonstrate the advantages of the invention. Following the trilobe of comparative example 3, also the inventive trilobe of example 4 was designed such that the characteristic length V/SA is around 0.5 mm. Also the wall thicknesses $d_2$ and $d_3$ and the diameter of the inner holes $d_1$ are the same as in example 3, namely 1.00 mm for the two wall thicknesses $d_2$ and $d_3$ and 2.00 mm for the diameter of the inner holes. Consequently, the outer diameter $d_0$ also amounts to 7.5 mm. For example 4, two semispheres with a diameter of 7.5 mm have been taken as the two outwardly curved arches, whose heights have been rammed from 3.75 mm of the full semisphere to 0.45 mm. Thus, $h_2$ and $h_3$ are 0.45 mm. $h_1$ was then calculated such that a characteristic length V/SA of 0.50 mm resulted. The respective value of $d_1$ amounts to 6.60 mm, which at the end relates to a total height do of only 7.5 mm.

The shaped catalyst body of inventive example 4 has a characteristic length V/SA of 0.50 mm, which is approximately the same as of the comparative trilobe of example 3. The simulation of the side crush strength SCS shows a value of 46.7 N and a high side crush strength per body volume SCS/V of 0.273 N/mm³. This indicates a stable shaped body with a low crushing risk during the filling of the reaction tubes. The visualized catalyst bed in a 21 mm reaction tube is shown in FIG. 7. Compared with the visualized catalyst bed of the comparative trilobe of example 3, it filled more regularly with less areas of open spaces. This is inter alia due to the lower total height. The simulated geometrical arrangement results in a packing density of only 322 kg/m³, which is approximately 6% higher than that of the comparative trilobe of example 3. The surface area SA per packing volume was 648 m²/m³ which is a very suitable value. With this simulated catalyst bed, the pressure drop at a flow of 1.0 m/s of air at 20° C. and a pressure at the end of the reactor tube of 0.1 MPa abs was calculated. It amounts to 779.9 Pa/m, which is higher than that of the comparative trilobe of example 3, but significantly below 1000 Palm.

In an overall view and valuation of the characteristic length, the side crush strength per body volume, the packing density and the pressure drop of the inventive trilobe of example 4, the values are in their entirety advantageous over the values of the comparative rings of examples 1 and 2 and the comparative trilobe of examples 3. This relates to the facts that the comparative rings of examples 1 and 2 are mainly disadvantageous due to their high pressure drop of >1000 Pa/m, and the comparative trilobe of example 3 is mainly disadvantageous due to its low packing density and its unfavorable geometrical arrangement in the reaction tube, although its pressure drop is even lower than that of the inventive trilobe of example 4. In contrast to examples 1, 2 and 3, the inventive trilobe of example 4 avoids all these disadvantages and demonstrates well balanced overall features.

Example 5 (Inventive)

Example 5 relates to a further inventive trilobe with three continuous holes and outwardly curved arches at the two cover sides. As the inventive trilobe of example 4, it is also based on a characteristic length V/SA of 0.50 mm, wall thicknesses $d_2$ and $d_3$ of 1.00 mm and a diameter of the inner holes $d_1$ of 2.00 mm. Consequently, the outer diameter $d_0$ also amounts to 7.5 mm. The trilobe of example 5 differs from that of example 4 by the shape and the dimension of its outwardly curved arches. For example 5, two circle segments with a height of 1.00 mm have been taken as the two outwardly curved arches. Thus, $h_2$ and $h_3$ are 1.00 mm. $h_1$ was then calculated such that a characteristic length V/SA of 0.50 mm resulted. The respective value of $d_1$ amounts to 5.50 mm, which at the end relates to a total height do of only 7.5 mm.

The shaped catalyst body of inventive example 5 has a characteristic length V/SA of 0.50 mm, which is approximately the same as of the comparative trilobe of example 3 and exactly the same of the inventive trilobe of example 4. The simulation of the side crush strength SCS shows a value of 48.1 N and a high side crush strength per body volume SCS/V of 0.292 N/mm³. This indicates a stable shaped body with a low crushing risk during the filling of the reaction tubes. The visualized catalyst bed in a 21 mm reaction tube is shown in FIG. 7. The visualized catalyst bed looks similar to that of inventive example 4 and is, compared with that of comparative example 3, filled more regularly with less areas of open spaces. This is inter alia due to the lower total height. The simulated geometrical arrangement results in a packing density of only 330 kg/m³, which is approximately 9% higher than that of the comparative trilobe of example 3. The surface area SA per packing volume was 653 m²/m³ which is a very suitable value. With this simulated catalyst bed, the pressure drop at a flow of 1.0 m/s of air at 20° C. and a pressure at the end of the reactor tube of 0.1 MPa abs was calculated. It amounts to 870.5 Pa/m, which is higher than that of the comparative trilobe of example 3 and the inventive trilobe of example 4, but still significantly below 1000 Palm.

An overall view and valuation of the characteristic length, the side crush strength per body volume, the packing density and the pressure drop of the inventive trilobe of example 5 comes to the same conclusion as in example 4. Also the respective values of the inventive trilobe of example 5 are in their entirety advantageous over the values of the comparative rings of examples 1 and 2 and the comparative trilobe of examples 3.

FIG. 8 summarizes the results of examples 1 to 5 in an illustrative overview, in which each result of the four criteria characteristic length, side crush strength per body volume, packing density and pressure drop is evaluated by "−" (disadvantageous), "o" (neutral) and "+" (advantageous). It shows that the inventive trilobes of examples 4 and 5 with three continuous holes and outwardly curved arches at the two cover sides are advantageous in all four criteria, whereas the comparative shapes of examples 1, 2 and 3 have at least one disadvantageous criterion.

Example 6 (Comparative)

Example 6 relates to a 5.0×5.0×2.0 ring with an outer diameter of 5.0 mm, an inner hole with a diameter of 2.0 mm and a height of 5.0 mm, which is a typical shape and dimension of a Mo, Fe and Bi multi-metal oxide catalyst. It was already mentioned above as starting point of the simulation of examples 6 to 10. The properties of such rings have been simulated as mentioned above and are summarized in FIG. 9. As for examples 1 to 5, also for examples 6 to 10 the visualized catalyst beds and an illustrative overview is shown: the visualized catalyst beds in a 26 mm reactor tube in FIG. 10 and the illustrative overview in FIG. 11.

Although the characteristic length V/SA, the packing density and the surface area SA per packing volume show good values, the side crush strength per tablet volume SCS/V is not outstanding but at least acceptable. However, the pressure drop at a flow of 1.0 m/s of air at 20° C. and a pressure at the end of the reactor tube of 0.1 MPa abs is very high. In an overall view, the comparative ring is very disadvantageous due to its very high pressure drop.

Example 7 (Comparative)

35 Example 7 relates to a 8.0×7.5×1.5 trilobe with three continuous holes, $d_2$ and $d_3$ values of 1.5 mm and two flat cover sides. It was designed on the basis of typical state of the art catalyst dimensions used in 26 mm reactor tubes for the oxidation of propene to acrolein or acrylic acid. Compared with the ring of example 6, the pressure drop at a flow of 1.0 m/s of air at 20° C. and a pressure at the end of the reactor tube of 0.1 MPa abs amounts only to roughly a third of the value of the ring and is very low. The characteristic length V/SA also shows a good value, and the side crush strength per tablet volume SCS/V as well as the surface area SA per packing volume are acceptable. However, the packing density is very low. In an overall view, the comparative trilobe is very disadvantageous due to its very low packing density.

Example 8 (Inventive)

Example 8 shows the very advantageous effect of outwardly curved arches at the two cover sides of a trilobe with three continuous holes. Its outer dimensions $d_0$ and $h_0$ are the same as of the comparative trilobe of example 7, namely 8.0 mm for do and 7.5 mm for $h_0$. Also the diameters $d_1$ of the three inner holes as well as the wall thicknesses $d_2$ and $d_3$ are the same, namely 1.5 mm for $d_1$, $d_2$ and do. The inventive trilobe of example 8 only differs from the comparative trilobe of example 7 by having two outwardly curved arches at the two cover sides with a height $h_2$ and $h_3$ of 0.6 mm.

The simulation clearly shows that the characteristic length V/SA, the packing density, the surface area SA per packing volume and the pressure drop at a flow of 1.0 m/s of air at 20° C. and a pressure at the end of the reactor tube of 0.1 MPa abs are very beneficial, and even the side crush strength per tablet volume SCS/V remains acceptable. In an overall view, the inventive trilobe is very advantageous since all the five significant values are predominantly very beneficial but at least acceptable and none of the five values is disadvantageous.

Example 9 (Comparative)

Example 9 is a variation of comparative example 7, in which the outer diameter $d_0$ was increased from 8.0 mm to 8.3 mm, the total height $h_0$ from 7.5 mm to 7.8 mm and the $d_2$ and $d_3$ values from 1.50 mm to 1.83 mm.

The increased wall thicknesses $d_2$ and $d_3$ lead to an increased side crush strength per tablet volume SCS/V. The pressure drop at a flow of 1.0 m/s of air at 20° C. and a pressure at the end of the reactor tube of 0.1 MPa abs remained at a very low value and was actually a bit lower than in example 7, and the characteristic length V/SA increased from 0.71 mm to 0.86 mm, which is still an acceptable value for this trilobe size. However, the packing density is still very low and the surface area SA per packing volume significantly decreased from 580 $m^2/m^3$ to only 505 $m^2/m^3$, which is very low. In an overall view, the comparative trilobe is very disadvantageous due to its very low packing density and its very low surface area SA per packing volume.

Example 10 (Inventive)

Example 10 shows the very advantageous effect of outwardly curved arches at the two cover sides of a trilobe with three continuous holes. Its outer dimensions $d_0$ and $h_0$ are the same as of the comparative trilobe of example 9, namely 8.3 mm for do and 7.8 mm for $h_0$, as well as its wall thicknesses $d_2$ and $d_3$, namely 1.83. The inventive trilobe of example 10 differs from the comparative trilobe of example 9 by smaller inner holes having a diameter of only 1.2 mm instead of 1.5 mm, and by having two outwardly curved arches at the two cover sides with a height $h_2$ and $h_3$ of 0.35 mm.

The simulation clearly shows that the side crush strength per tablet volume SCS/V, the packing density and the pressure drop at a flow of 1.0 m/s of air at 20° C. and a pressure at the end of the reactor tube of 0.1 MPa abs are very beneficial, and even the characteristic length V/SA and the surface area SA per packing volume remains acceptable. In an overall view, the inventive trilobe is very advantageous since all the five significant values are predominantly very beneficial but at least acceptable and none of the five values is disadvantageous.

The invention claimed is:

1. A shaped catalyst body for heterogeneously catalyzed reactions of organic compounds in the gas-phase in fixed-bed reactors, wherein the shaped catalyst body is characterized by
   (a) containing at least one element from group 3 to 12 of the Periodic Table of the Elements, whereby the total amount of the elements from group 3 to 12 of the Periodic Table of the Elements is 0.01 to 85 wt. %;
   (b) a cylindrical structure with a top cover, a bottom cover and a lateral surface with three notches running in the cylinder periphery along the cylinder height forming a three-lobed structure;
   (c) three continuous essentially circular holes as void spaces with a diameter $d_1$ and a tolerance of $d_1$ for each hole of 15% based on the shortest diameter of the respective hole, running from one cover side to the other cover side, wherein each hole is assigned to one lobe and wherein the midpoints of the three holes are arranged essentially equidistantly over the horizontal cross section of the cylindrical structure with a tolerance of 15% based on the shortest distance between two midpoints of two holes;
   wherein
   (d) the wall thickness $d_2$ between two continuous holes over the horizontal cross section of the cylindrical structure at the imaginary connection line between the midpoints of the two continuous holes is essentially the same for all three walls between two continuous holes with a tolerance of $d_2$ of 15% based on the shortest wall thickness;
   (e) for each of the three lobes, the wall thickness $d_3$ between a continuous hole and the lateral surface is, within a 180° segment, which is defined as the segment over a horizontal cross section of the cylindrical structure, whose chord is parallel to the imaginary connection line between the two midpoints of the adjacent two continuous holes, essentially constant within the respective segment and essentially the same for all three segments of the three lobes with a tolerance of $d_3$ of 15% based on the shortest wall thickness;
   (f) the ratio of each of the three wall thicknesses $d_2$ to each of the three wall thicknesses $d_{3x}$, whereby $d_{3x}$ are the wall thicknesses located over a horizontal cross section of the cylindrical structure at the extension of the imaginary connection lines between the central midpoint of the cylinder and the midpoint of the continuous hole of the respective lobe, is 0.9 to 1.1;
   (g) the top cover and the bottom cover have outwardly curved arches with the highest height $h_2$ for the top cover and the highest height $h_3$ for the bottom cover, wherein $h_2$ is the distance between
   the imaginary plane top cover area of an imaginary circular cylinder comprising a circular lateral surface which just encircles the three lobes of the shaped catalyst body, whereby the imaginary plane top cover area contacts the circular lateral surface at a right angle at the highest horizontal level at which the circular lateral surface of the imaginary circular cylinder just contacts at least one lobe; and
   the highest height of the top cover above the imaginary plane top cover area, measured perpendicular to the imaginary plane top cover area;
   $h_3$ is the distance between
   the imaginary plane bottom cover area of the imaginary circular cylinder comprising a circular lateral surface which just encircles the three lobes of the shaped catalyst body, whereby the imaginary plane bottom cover area contacts the circular lateral surface at a right angle at the lowest horizontal level at which the circular lateral surface of the imaginary circular cylinder just contacts at least one lobe; and
   the highest height of the bottom cover above the imaginary plane bottom cover area, measured perpendicular to the imaginary plane bottom cover area; and the imaginary circular cylinder has the height $h_1$ measured as the distance between the imaginary plane top cover area and the imaginary plane bottom cover area; and (h) the diameters $d_1$ are independently of one another from 1 to 5 mm, the wall thicknesses $d_2$ and $d_3$ are independently of one another 0.5 to 3 mm, the heights $h_2$ and $h_3$ are independently of one another 0.2 to 3 mm, and the height $h_1$ is 2 to 10 mm.

2. The shaped catalyst body according to claim 1, wherein the shaped catalyst body contains at least one element of V, Nb, Mo, Fe, Co, Ni, Pd, Pt, Cu, Ag and Zn.

3. The shaped catalyst body according to claim 1, wherein the shaped catalyst body contains an oxidic material comprising vanadium and phosphorus.

4. The shaped catalyst body according to claim 1, wherein at least one of the two outwardly curved arches has a convex shape over the respective cover.

5. The shaped catalyst body according to claim 1, wherein at least one of the two outwardly curved arches has the shape of a compressed semicircle over the respective cover.

6. The shaped catalyst body according to claim 1, wherein the inner angles α at the edges at which the lateral surface of the imaginary circular cylinder contacts the outwardly curved arching of the top cover and the outwardly curved arching of the bottom cover are independently of one another 120 to 160°.

7. The shaped catalyst body according to claim 1, wherein the outer diameter do, which is the diameter of the smallest circle, which just encircles the shaped catalyst body over the horizontal cross section, is from 5 to 15 mm, and the total height $h_0$, which is the sum of $h_1$, $h_2$ and $h_3$, is from 4 to 12 mm.

8. The shaped catalyst body according to claim 1, wherein the shaped catalyst body contains an oxidic material and wherein the inner area of the notches at the lateral surface between two adjacent lobes, which is defined as the area between the imaginary vertical lines, at which the chords of the imaginary 180° segments as specified in feature (e) cross the lateral surface of the lobes, is at least partly filled with the oxidic material as specified in feature (a).

9. The shaped catalyst body according to claim 8, wherein the filling of the notches at the lateral surface has a concave shape.

10. A process for preparing the shaped catalyst body as claimed in claim 1, comprising
    (a) the preparation of a powdery or granular precursor material containing at least one element from group 3 to 12 of the Periodic Table of the Elements, and
    (b) its compaction to the shaped catalyst body.

11. The process according to claim 10, wherein a vanadium and phosphorus oxide containing shaped catalyst body is prepared by
    (a) reacting a pentavalent vanadium compound and a pentavalent or trivalent phosphorus compound with an organic reducing agent, isolating the obtained vanadium and phosphorus containing precursor, drying it, converting the dried mass into a powdery or granular precursor material, and
    (b) compacting it to the shaped catalyst body.

12. A reactor tube filled with ≥100 particles of the shaped catalyst body as claimed in claim 1.

13. A process for the production of an oxidized organic compound by an heterogeneously catalyzed gas-phase oxidation of an organic compound in the presence of an oxygen containing gas and the shaped catalyst body as claimed in claim 1.

14. The process according to claim 13, wherein the oxidized organic compound is maleic anhydride, the organic compound is n-butane, and the shaped catalyst body containing an oxidic material comprising vanadium and phosphorus.

15. The process according to claim 13, wherein the oxidized organic compound is acrolein, acrylic acid, acrylonitrile, methacrolein or methacrylonitrile, the organic compound is propene or isobutene, and the shaped catalyst body contains an oxidic material comprising Mo, Fe and Bi.

* * * * *